US012608389B2

(12) United States Patent
Prezet et al.

(10) Patent No.: US 12,608,389 B2
(45) Date of Patent: Apr. 21, 2026

(54) DEVICE, SYSTEM AND METHOD FOR FILTERING AND ALTERING PROVIDER OBJECTS

(71) Applicant: AMADEUS S.A.S., Biot (FR)

(72) Inventors: Herve Prezet, Mougins (FR); Koen Baekelandt, Madrid (ES); Rodolphe Texier, Vallauris (FR); Thitiphunt Duwa, Bangkok (TH)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 18/912,914

(22) Filed: Oct. 11, 2024

(65) Prior Publication Data

US 2025/0131002 A1 Apr. 24, 2025

(30) Foreign Application Priority Data

Oct. 18, 2023 (EP) ..................................... 23306823

(51) Int. Cl.
*G06F 16/2458* (2019.01)
(52) U.S. Cl.
CPC ................................. *G06F 16/2477* (2019.01)
(58) Field of Classification Search
CPC ......... G06F 16/24564; G06F 16/24565; G06F 16/334; G06F 16/335
See application file for complete search history.

(56) References Cited

U.S. PATENT DOCUMENTS

| | | | |
|---|---|---|---|
| 10,331,746 B1 * | 6/2019 | Ledet | .................. G06F 16/9535 |
| 11,595,494 B1 | 2/2023 | Texier | |
| 2019/0130040 A1 * | 5/2019 | Ma | ...................... G06F 16/9038 |

(Continued)

FOREIGN PATENT DOCUMENTS

| | | |
|---|---|---|
| EP | 3809279 A1 | 4/2021 |
| EP | 3809345 A1 | 4/2021 |
| WO | 2015070975 A1 | 5/2015 |

OTHER PUBLICATIONS

European Search Report, mailed May 14, 2024, issued in corresponding European Patent Application No. 23306823.8, Filed Oct. 18, 2023.

(Continued)

*Primary Examiner* — William P Bartlett
(74) *Attorney, Agent, or Firm* — PERRY + CURRIER INC.

(57) ABSTRACT

A device, system and method for filtering provider objects from one or more provider systems are provided. An intermediation server implements a computing-process flow associated with a client device and one or more provider systems. The server receives, from the client device, during implementation of the computing-process flow, search criteria, and further receives provider objects that meet the search criteria, the provider objects associated with the one or more provider systems. The server applies computer-code content filters to the provider objects, the filters received from one or more computing devices excluded from the computing-process flow. When a given provider object fails to pass all the computer-code content filters, the server removes the given provider object from the provider objects, to generate filtered provider objects, and the server provides, during implementation of the computing-process flow, the filtered provider objects to the client device.

17 Claims, 19 Drawing Sheets

(56) References Cited

U.S. PATENT DOCUMENTS

| 2019/0155915 | A1 |   | 5/2019 | Huang et al. |
| 2021/0117849 | A1 | * | 4/2021 | Amadieu ............ G06F 16/9574 |
| 2021/0118030 | A1 | * | 4/2021 | Amadieu ........... G06Q 30/0619 |
| 2021/0174266 | A1 |   | 6/2021 | Akrimi et al. |
| 2023/0206138 | A1 |   | 6/2023 | Texier et al. |
| 2023/0281686 | A1 |   | 9/2023 | Texier et al. |

OTHER PUBLICATIONS

European Search Report, mailed Apr. 5, 2024, issued in corresponding European Patent Application No. 23306824.6, Oct. 18, 2023.

* cited by examiner

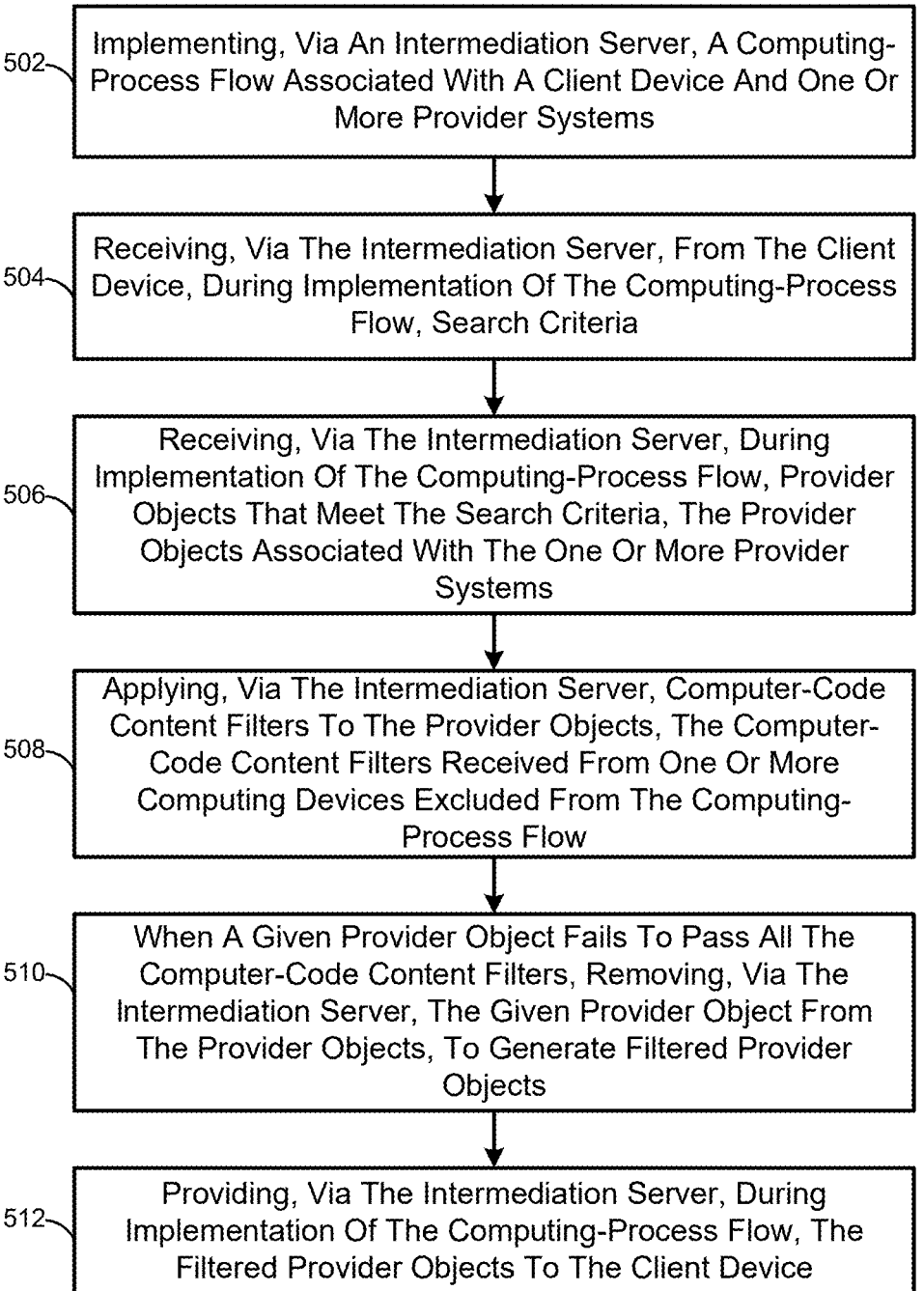

502 — Implementing, Via An Intermediation Server, A Computing-Process Flow Associated With A Client Device And One Or More Provider Systems 504 — Receiving, Via The Intermediation Server, From The Client Device, During Implementation Of The Computing-Process Flow, Search Criteria 506 — Receiving, Via The Intermediation Server, During Implementation Of The Computing-Process Flow, Provider Objects That Meet The Search Criteria, The Provider Objects Associated With The One Or More Provider Systems 508 — Applying, Via The Intermediation Server, Computer-Code Content Filters To The Provider Objects, The Computer-Code Content Filters Received From One Or More Computing Devices Excluded From The Computing-Process Flow 510 — When A Given Provider Object Fails To Pass All The Computer-Code Content Filters, Removing, Via The Intermediation Server, The Given Provider Object From The Provider Objects, To Generate Filtered Provider Objects 512 — Providing, Via The Intermediation Server, During Implementation Of The Computing-Process Flow, The Filtered Provider Objects To The Client Device

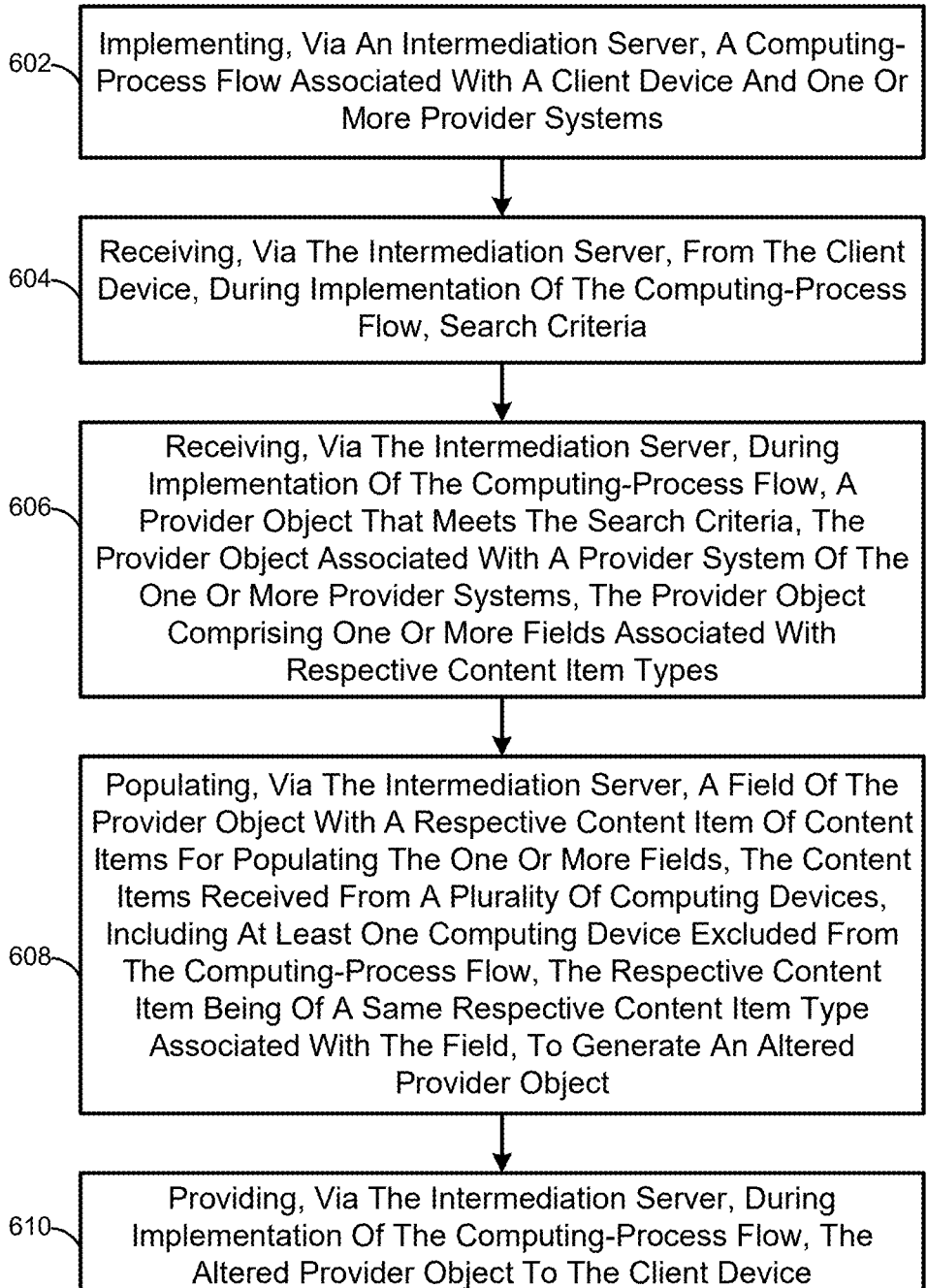

602 — Implementing, Via An Intermediation Server, A Computing-Process Flow Associated With A Client Device And One Or More Provider Systems 604 — Receiving, Via The Intermediation Server, From The Client Device, During Implementation Of The Computing-Process Flow, Search Criteria 606 — Receiving, Via The Intermediation Server, During Implementation Of The Computing-Process Flow, A Provider Object That Meets The Search Criteria, The Provider Object Associated With A Provider System Of The One Or More Provider Systems, The Provider Object Comprising One Or More Fields Associated With Respective Content Item Types 608 — Populating, Via The Intermediation Server, A Field Of The Provider Object With A Respective Content Item Of Content Items For Populating The One Or More Fields, The Content Items Received From A Plurality Of Computing Devices, Including At Least One Computing Device Excluded From The Computing-Process Flow, The Respective Content Item Being Of A Same Respective Content Item Type Associated With The Field, To Generate An Altered Provider Object 610 — Providing, Via The Intermediation Server, During Implementation Of The Computing-Process Flow, The Altered Provider Object To The Client Device

DEVICE, SYSTEM AND METHOD FOR FILTERING AND ALTERING PROVIDER OBJECTS

FIELD

The specification relates generally to intermediation between devices, and specifically to a device, system and method for filtering and/or altering provider objects from one or more provider systems.

BACKGROUND

The provision of various products, including for example travel-related goods and services (e.g., flights, hotel reservations, and the like) typically requires various discrete entities to exchange data defining various aspects of the products. Examples of such entities, in the context of travel-related products, include airlines, travel agencies, end users, reservation systems, and the like. Such entities may be configured to exchange data according to standardized formats and/or computing-process flows (e.g., in the context of travel-related products, according to the EDIFACT standard (Electronic Data Interchange for Administration, Commerce and Transport), and/or according to the extensible Markup Language (XML)-based New Distribution Capability (NDC)). Such standardized formats and/or computing-process flows may, however, be restrictive, and adapting such standardized formats and/or computing-process flows to filter or alter objects of data exchanges may require substantial processing resources.

SUMMARY

A first aspect of the present specification provides a method comprising: implementing, via an intermediation server, a computing-process flow associated with a client device and one or more provider systems; receiving, via the intermediation server, from the client device, during implementation of the computing-process flow, search criteria; receiving, via the intermediation server, during implementation of the computing-process flow, provider objects that meet the search criteria, the provider objects associated with the one or more provider systems; applying, via the intermediation server, computer-code content filters to the provider objects, the computer-code content filters received from one or more computing devices excluded from the computing-process flow; when a given provider object fails to pass all the computer-code content filters, removing, via the intermediation server, the given provider object from the provider objects, to generate filtered provider objects; and providing, via the intermediation server, during implementation of the computing-process flow, the filtered provider objects to the client device.

The method of the first aspect may further comprise: prior to implementing the computing-process flow, receiving the computer-code content filters from the one or more computing devices excluded from the computing-process flow; and storing the computer-code content filters at a memory, wherein applying the computer-code content filters to the provider objects may comprise one or more: accessing the computer-code content filters at the memory; and retrieving the computer-code content filters from the memory.

The method of the first aspect may further comprise: prior to implementing the computing-process flow, receiving the computer-code content filters from the one or more computing devices excluded from the computing-process flow;

storing the computer-code content filters at a memory; and applying respective timestamps to the computer-code content filters, the respective timestamps indicating when a respective computer-code content filter was one or more of received, generated and populated at the memory.

The method of the first aspect may further comprise: implementing an audit process for a provider object associated with a payment during implementation of the computing-process flow, wherein the provider object passed all the computer-code content filters, and the audit process may comprise: determining respective timestamps of the computer-code content filters, the respective timestamps indicative of when the computer-code content filters were received from the one or more computing devices excluded from the computing-process flow; and generating a report indicative of when the provider object was provided to the client device relative to the respective timestamps.

The method of the first aspect may further comprise: prior to implementing the computing-process flow, receiving indications of the computer-code content filters from the one or more computing devices excluded from the computing-process flow; converting the indications to the computer-code content filters; and storing the computer-code content filters at a memory.

The method of the first aspect may further comprise: applying, the computer-code content filters and further computer-code content filters to the provider objects, the further computer-code content filters received from one or more of the client device, the one or more provider systems and the intermediation server; when the given provider object fails to pass all of the computer-code content filters and the further computer-code content filters, removing the given provider object from the provider objects, to generate the filtered provider objects; and providing the filtered provider objects to the client device.

The method of the first aspect may further comprise: failing the given provider object when a first component of the given provider object passes a given computer-code content filter and a second component of the given provider object fails to pass the given computer-code content filter.

The method of the first aspect may further comprise: failing the given provider object when a first component of the given provider object fails to pass a given computer-code content filter and a second component of the given provider object passes, or fails to pass, the given computer-code content filter.

The method of the first aspect may further comprise: when the given provider object comprises a first component that passes a given computer-code content filter and a second component that fails to pass the given computer-code content filter, removing the second component from the given provider object to generate an updated provider object; and adding the updated provider object to the filtered provider objects provided to the client device.

At the method of the first aspect, a secondary provider object may be dependent on a primary provider object, the method of the first aspect may further comprise: when the primary provider object fails to pass all the computer-code content filters, removing the primary provider object and the secondary provider object from the provider objects, to generate the filtered provider objects.

The method of the first aspect may further comprise: receiving a new computer-code content filter; applying the new computer-code content filter to past provider objects associated with payments during previous implementations of the computing-process flow; and when a given past provider object fails the new computer-code content filter, providing an alert to a network address associated with the given past provider object.

A second aspect of the present specification provides an intermediation server comprising: at least one controller; and a computer-readable storage medium having stored thereon program instructions that, when executed by the at least one controller, causes the at least one controller to perform a set of operations comprising: implementing a computing-process flow associated with a client device and one or more provider systems; receiving, from the client device, during implementation of the computing-process flow, search criteria; receiving, during implementation of the computing-process flow, provider objects that meet the search criteria, the provider objects associated with the one or more provider systems; applying computer-code content filters to the provider objects, the computer-code content filters received from one or more computing devices excluded from the computing-process flow; when a given provider object fails to pass all the computer-code content filters, removing the given provider object from the provider objects, to generate filtered provider objects; and providing, during implementation of the computing-process flow, the filtered provider objects to the client device.

At the intermediation server of the second aspect, the set of operations may further comprise: prior to implementing the computing-process flow, receiving the computer-code content filters from the one or more computing devices excluded from the computing-process flow; and storing the computer-code content filters at a memory, wherein applying the computer-code content filters to the provider objects may comprise one or more: accessing the computer-code content filters at the memory; and retrieving the computer-code content filters from the memory.

At the intermediation server of the second aspect, the set of operations may further comprise: prior to implementing the computing-process flow, receiving the computer-code content filters from the one or more computing devices excluded from the computing-process flow; storing the computer-code content filters at a memory; and applying respective timestamps to the computer-code content filters, the respective timestamps indicating when a respective computer-code content filter was one or more of received, generated and populated at the memory.

At the intermediation server of the second aspect, the set of operations may further comprise: implementing an audit process for a provider object associated with a payment during implementation of the computing-process flow, wherein the provider object passed all the computer-code content filters, and the audit process may comprise: determining respective timestamps of the computer-code content filters, the respective timestamps indicative of when the computer-code content filters were received from the one or more computing devices excluded from the computing-process flow; and generating a report indicative of when the provider object was provided to the client device relative to the respective timestamps.

At the intermediation server of the second aspect, the set of operations may further comprise: prior to implementing the computing-process flow, receiving indications of the computer-code content filters from the one or more computing devices excluded from the computing-process flow; converting the indications to the computer-code content filters; and storing the computer-code content filters at a memory.

At the intermediation server of the second aspect, the set of operations may further comprise: applying, the computer-code content filters and further computer-code content filters to the provider objects, the further computer-code content filters received from one or more of the client device, the one or more provider systems and the intermediation server; when the given provider object fails to pass all of the computer-code content filters and the further computer-code content filters, removing the given provider object from the provider objects, to generate the filtered provider objects; and providing, via the intermediation server, the filtered provider objects to the client device.

At the intermediation server of the second aspect, the set of operations may further comprise: failing the given provider object when a first component of the given provider object passes a given computer-code content filter and a second component of the given provider object fails to pass the given computer-code content filter.

At the intermediation server of the second aspect, the set of operations may further comprise: failing the given provider object when a first component of the given provider object fails to pass a given computer-code content filter and a second component of the given provider object passes, or fails to pass, the given computer-code content filter.

At the intermediation server of the second aspect, the set of operations may further comprise: when the given provider object comprises a first component that passes a given computer-code content filter and a second component that fails to pass the given computer-code content filter, removing the second component from the given provider object to generate an updated provider object; and adding the updated provider object to the filtered provider objects provided to the client device.

At the intermediation server of the second aspect, a secondary provider object may be dependent on a primary provider object, and the set of operations may further comprise: when the primary provider object fails to pass all the computer-code content filters, removing the primary provider object and the secondary provider object from the provider objects, to generate the filtered provider objects.

At the intermediation server of the second aspect, the set of operations may further comprise: receiving a new computer-code content filter; applying the new computer-code content filter to past provider objects associated with payments during previous implementations of the computing-process flow; and when a given past provider object fails the new computer-code content filter, providing an alert to a network address associated with the given past provider object.

A third aspect of the present specification provides a non-transitory computer-readable storage medium having stored thereon program instructions that, when executed by at least one computing device, causes the at least one computing device to perform a method comprising: implementing a computing-process flow associated with a client device and one or more provider systems; receiving, from the client device, during implementation of the computing-process flow, search criteria; receiving, during implementation of the computing-process flow, provider objects that meet the search criteria, the provider objects associated with the one or more provider systems; applying computer-code content filters to the provider objects, the computer-code content filters received from one or more computing devices excluded from the computing-process flow; when a given provider object fails to pass all the computer-code content filters, removing the given provider object from the provider objects, to generate filtered provider objects; and providing, during implementation of the computing-process flow, the filtered provider objects to the client device.

The method of the third aspect may further comprise: prior to implementing the computing-process flow, receiving the computer-code content filters from the one or more computing devices excluded from the computing-process flow; and storing the computer-code content filters at a memory, wherein applying the computer-code content filters to the provider objects may comprise one or more: accessing the computer-code content filters at the memory; and retrieving the computer-code content filters from the memory.

The method of the third aspect may further comprise: prior to implementing the computing-process flow, receiving the computer-code content filters from the one or more computing devices excluded from the computing-process flow; storing the computer-code content filters at a memory; and applying respective timestamps to the computer-code content filters, the respective timestamps indicating when a respective computer-code content filter was one or more of received, generated and populated at the memory.

The method of the third aspect may further comprise: implementing an audit process for a provider object associated with a payment during implementation of the computing-process flow, wherein the provider object passed all the computer-code content filters, and the audit process may comprise: determining respective timestamps of the computer-code content filters, the respective timestamps indicative of when the computer-code content filters were received from the one or more computing devices excluded from the computing-process flow; and generating a report indicative of when the provider object was provided to the client device relative to the respective timestamps.

The method of the third aspect may further comprise: prior to implementing the computing-process flow, receiving indications of the computer-code content filters from the one or more computing devices excluded from the computing-process flow; converting the indications to the computer-code content filters; and storing the computer-code content filters at a memory.

The method of the third aspect may further comprise: applying, the computer-code content filters and further computer-code content filters to the provider objects, the further computer-code content filters received from one or more of the client device, the one or more provider systems and the computing device; when the given provider object fails to pass all of the computer-code content filters and the further computer-code content filters, removing the given provider object from the provider objects, to generate the filtered provider objects; and providing the filtered provider objects to the client device.

The method of the third aspect may further comprise: failing the given provider object when a first component of the given provider object passes a given computer-code content filter and a second component of the given provider object fails to pass the given computer-code content filter.

The method of the third aspect may further comprise: failing the given provider object when a first component of the given provider object fails to pass a given computer-code content filter and a second component of the given provider object passes, or fails to pass, the given computer-code content filter.

The method of the third aspect may further comprise: when the given provider object comprises a first component that passes a given computer-code content filter and a second component that fails to pass the given computer-code content filter, removing the second component from the given provider object to generate an updated provider object; and adding the updated provider object to the filtered provider objects provided to the client device.

At the method of the third aspect, a secondary provider object may be dependent on a primary provider object, the method of the third aspect may further comprise: when the primary provider object fails to pass all the computer-code content filters, removing the primary provider object and the secondary provider object from the provider objects, to generate the filtered provider objects.

The method of the third aspect may further comprise: receiving a new computer-code content filter; applying the new computer-code content filter to past provider objects associated with payments during previous implementations of the computing-process flow; and when a given past provider object fails the new computer-code content filter, providing an alert to a network address associated with the given past provider object.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 5 depicts a method for filtering provider objects from one or more provider systems, according to non-limiting examples.

FIG. 6 depicts a method for altering provider objects from one or more provider systems, according to non-limiting examples.

DETAILED DESCRIPTION

Figure 1:
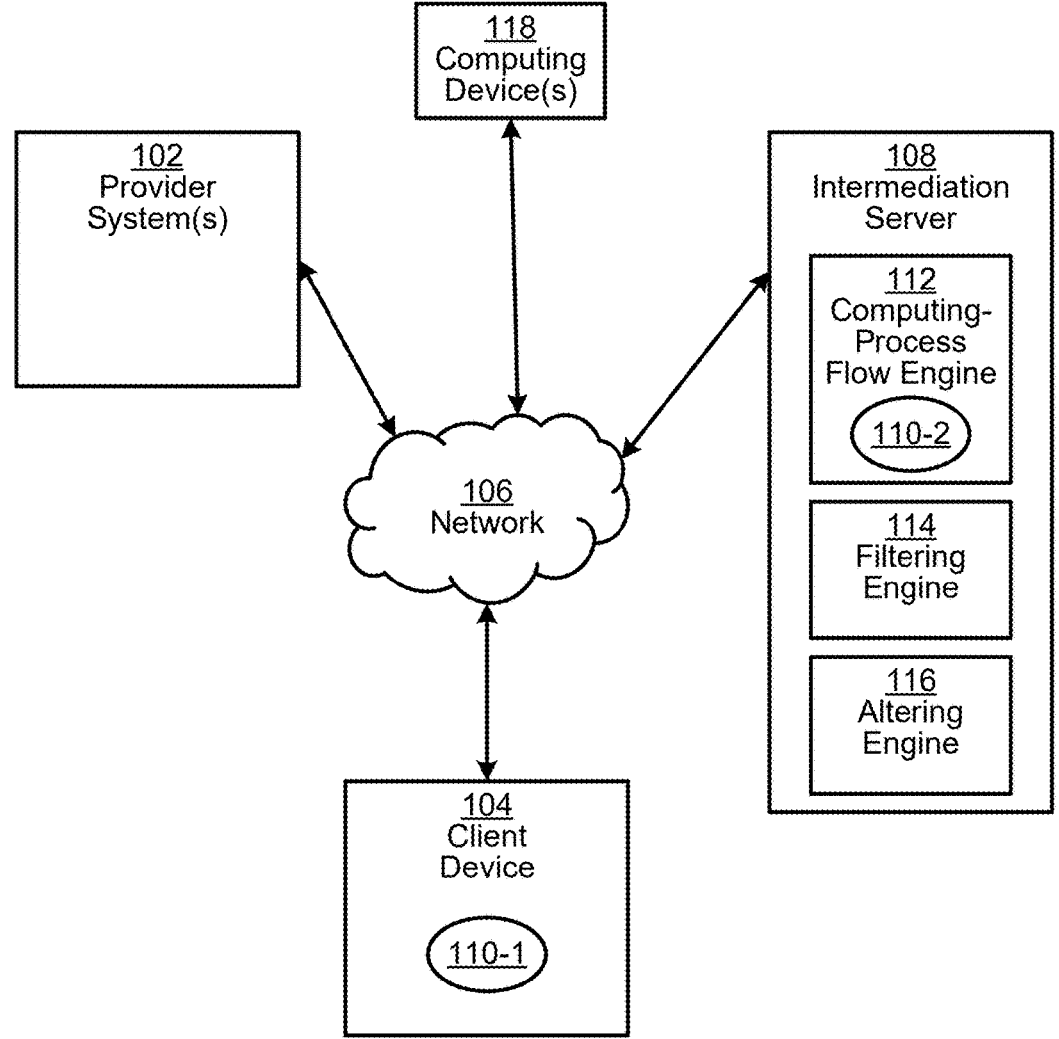
FIG. 1 depicts a system for filtering and/or altering provider objects from one or more provider systems, according to non-limiting examples.

FIG. 1 depicts a system 100 for intermediation between a provider system and a client device. The system 100 includes one or more provider systems 102 (e.g., one or more servers or other suitable computing devices), which may be operated by one or more provider entities. The system 100 may include a plurality of client devices 104, although only one client device 104 is shown in FIG. 1 for illustrative purposes.

Provider objects, in the examples discussed herein, may comprise provider objects and/or data records which correspond to products and/or items, such as travel-related goods and services (e.g., flights, hotel reservations, car rentals and the like), provided by a provider system 102. More specifically, the products and/or items discussed in the examples below may be flight tickets and related services (e.g., limo pickup services, excursions at a destination, baggage check services, in-flight food, entertainment, pet-related services, and the like). However, as will be apparent to those skilled in the art, the systems and methods discussed below may also be applied to various other types of data objects and/or items including, but not limited to, data objects corresponding to any suitable products and/or any suitable items available from any suitable website, and the like. As will be described below, however, certain provider objects may be provided in any other suitable manner (e.g., by computing devices other than the provider systems 102).

Delivery of the items mentioned above is typically controlled by a provider entity operating a provider system 102, such as an airline in the case of the items discussed in connection with the examples provided herein.

The system 100 may include a plurality of provider systems 102, each operated by respective provider entities (e.g., various airlines), although only one provider system 102 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 102.

A provider object is understood to define an item, or a combination of items, which may be offered for purchase (e.g., by end users of the items) including, but not limited to one or more of flights, train rides, hotel stays, airport lounge access, seat upgrades, baggage check services, in-flight food, entertainment, pickup services, excursion services, pet-related services, and the like, and/or associated services. Thus, in examples discussed below, a provider object may define a flight operated by the provider entity, and/or services associated with the flight, or proposed as standalone services. Each provider object therefore may contain various fields (e.g., data fields), and the like. Certain fields define item attributes, such as product object identifiers (e.g., service identifiers, item identifiers, product identifiers and the like), locations, dates and times corresponding to the products (e.g., flight times and other itinerary data). The type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Requests for provider objects may be received at the provider system 102 from other components of the system 100. For example, the requests may be received from a client device 104, via a network 106 (e.g., any suitable combination of local and wide area networks, including the Internet) and via an intermediation server 108. As will be described below, the intermediation server 108 generally intermediates between the client device 104 and the provider system 102, such that the client device 104 may request provider objects from the provider system 102, and/or more than one provider system 102, via the intermediation server 108.

Furthermore, the intermediation server 108 may convert data between formats associated with provider systems 102 and the client device 104. For example, a first provider system 102 may communicate and/or provide provider objects, and/or offers for provider objects, according to a first standard type, and a second provider system 102 may communicate and/or provide provider objects, and/or offers for provider objects, according to a second standard type (e.g., which may be the same or different from the first standard type). Neither standard type may be compatible with a format used by the client device 104 to communicate. As such, the intermediation server 108 may convert data received in different formats from the provider system 102, to a format compatible with the client device 104, and vice versa.

The client device 104, in the present example, may be operated by a travel agent entity, and therefore generates and provides requests for provider objects (e.g., representing products which may be for purchase), and/or requests to purchase products (e.g., represented by the provider objects), to the provider system 102, via the intermediation server 108, on behalf of end users (e.g., travelers).

In one example, the intermediation server 108 may comprise an aggregator server which communicates with a plurality of provider systems 102 and aggregates provider objects and/or offers for provider objects from the plurality of provider system 102, to provide to the client device 104.

Alternatively, a client device 104 may be operated by a provider system 102. In yet another alternative, a provider system 102 may operate the intermediation server 108.

Hence, it is understood that while the provider system 102, the client device 104 and the intermediation server 108 are all depicted as being separate from each other in FIG. 1, they may be associated with various combinations of one or more entities, and/or functionality of the provider system 102, the client device 104 and the intermediation server 108 may be combined in any suitable manner at one or more computing devices and/or servers and/or cloud computing devices. As such, herein, rather than refer to components of the system 100 communicating via transmitting data therebetween (e.g., such as via the network 106), herein communication between components of the system 100 is referred to as the components providing data, and the like, therebetween which may include, but is not limited to, transmitting data over the network 106, communicating data when the components are local to each other and/or combined, and the like.

Various other mechanisms for initiating the creation of the provider objects are also contemplated. For example, end users (via the client device 104 and/or client devices and/or additional computing devices, not shown in FIG. 1) may initiate the creation of the provider objects via direct interaction with a website hosted by the intermediation server 108, or another server. For example, the client device 104 may comprise a server operating a website that an end user may access to generate and provide requests for provider objects; alternatively, or in addition, the client device 104 may comprise a personal computer, a laptop, a mobile device, and the like, operated by an end user to access such a website to generate and provide requests for provider objects. Various mechanisms for the creation of provider objects will be apparent to those skilled in the art, such as the "offer" and "order" mechanisms specified by the NDC standard. The creation of provider objects in response to product purchase requests is not discussed in further detail herein.

The client device 104 is configured to receive data contained in the provider objects via the intermediation server 108. Data obtained by the client device 104, via the intermediation server 108, may be presented to users served by the client device 104, for example via a display screen which may be local to the client device 104, for example see FIG. 4); further information associated with the items represented by the provider objects may be requested by the client device 104 which may include, but is not limited to the client device 104 ordering the items. In other words, the system 100 enables the client device 104 to request further information associated with the items represented by the provider objects, via the intermediation server 108. The client device 104 may be configured to request the further information and/or initiate such orders by providing requests to the provider system 102 via the intermediation server 108.

The provider objects provided by the provider system 102 generally include provider object data representing at least one item provided by the provider system 102. In some examples, the provider object data may include a provider object identifier and/or provider object identifier data, that identifies the provider object to the provider system 102. In particular examples related to the travel industry, the provider object data may generally comprise information that identifies a travel related product and/or service. Whether the provider object data includes a specific provider object identifier, or not may depend on whether a provider object is being in an NDC or EDIFACT format. For example, when a provider object comprises an NDC offer, the provider object identifier data may comprise an identifier generated by the provider system 102 which specifically identifies the NDC offer. However, when a provider object comprises an Edifact recommendation, which generally does not include a specific identifier, the Edifact recommendation may be identified by the provider system 102 based on provider object identifier data such as characteristics of the Edifact recommendation such as a specific order and/or format of data of the Edifact recommendation.

In general, communication between the client device 104 and the intermediation server 108 occurs via a computing-process flow 110 implemented by the client device 104, and the intermediation server 108, such as an Applications Programming Interface (API), and the like. For example, during ordering of a provider object (e.g., booking a flight), communications between the client device 104 and the intermediation server 108 may be defined by the API. As depicted, the client device 104 and the intermediation server 108 may respectively implement a client-side portion 110-1 and a server-side portion 110-2 of the computing-process flow 110 that are complementary to each other. In particular, the intermediation server 108 may be implementing the server-side portion 110-2 of the computing-process flow 110 via a computing-process flow engine 112.

In particular, when the intermediation server 108 receives a communication from the client device 104, in conjunction with the client device 104 implementing the API, the intermediation server 108 is generally configured to understand and/or determine which step of the computing-process flow 110 is being implemented at the client device 104 to generate the communication.

The computing-process flow engine 112 may implement the server-side aspects of the computing-process flow 110, and may provide to the client device 104 a graphic user interface (GUI) and the like, for example via a browser application (not depicted) at the client device 104, which may enable the client device 104 to implement the client-side aspects of the computing-process flow 110.

As used herein, the term "engine" refers to hardware (e.g., a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

It is further understood that, in some examples, the intermediation server 108 and/or one or more of the provider systems 102 operate according to a given standard, such as EDIFACT, NDC, and the like, and hence, the computing-process flow 110 may operate according to the given standard. Hence it may be challenging, if not impossible, to modify the computing-process flow 110, at least not without significant use of processing resources in the system 100. However, there may be situations where filtering and/or altering provider objects within the computing-process flow 110 may be necessary, but currently there is no efficient way of providing such filtering and/or alternations, especially when such filtering and/or altering is required by third party computing devices who do not participate in the computing-process flow 110.

As such, as will be described herein, the intermediation server 108 may implement a filtering engine 114 and an altering engine 116. The filtering engine 114 may be used to filter provider objects provided by one or more provider systems 102, and the altering engine 116 may be used to alter provider objects provided by one or more provider systems 102. Such filtering and/or altering of provider object may occur prior to providing the provider objects to the client device 104.

For example, filtering of provider objects by the filtering engine 114 may occur via computer-code content filters received from one or more computing devices 118 excluded from the computing-process flow 110 and optionally a provider system 102 and/or a client device 104 (e.g., when operated by a travel agent entity, and the like) and/or the intermediation server 108. In particular, computer-code content filters as described herein may be used to filter provider objects and/or remove provider objects from a response to a request for provider objects received from the client device 104. For example, some provider objects may not be suitable for a jurisdiction in which the client device 104 is located and/or for a particular user of the client device 104. Such computer-code content filters are described herein with respect to FIG. 4.

Furthermore, some fields of provider objects may be associated with and/or dedicated to certain types of content items, such as text, images, videos, and/or more specific types of text, images, videos, amongst other possibilities described in more detail below. In some examples, such fields may be prepopulated, whereas in other examples such fields may be empty. In particular, altering of provider objects may occur via the altering engine 116 and via content items accessible to the altering engine 116, the content items for populating fields of provider objects, the content items received from a plurality of computing devices, which may include at least one computing device 118 excluded from the computing-process flow 110, and which may further include one or more computing devices of one or more provider systems 102, the client device 104 (e.g., when operated by a travel agent entity, and the like), and/or the intermediation server 108 and the like. In these examples, it is understood that a provider object comprises one or more fields associated with and/or dedicated to, respective content item types, and such fields may be populated by the content items using the altering engine 116. Such content items are described herein with respect to FIG. 4.

The computing devices 118 may be operated by any suitable entity, such as government entities, regulator entities, entities different from entities operating the provider systems 102, and the like, as described in more detail below. In some instances a computing device 118 may be operated by an entity having a relationship with an entity operating a provider system 102 and/or the intermediation server 108, and such an entity in such a relationship may also provide provider objects (e.g., such as hotel stays, and/or goods and/or services offered on flights), for example to be combined with provider objects provided by a provider system 102 (e.g., such as flights).

However, it is understood that the computing devices 118 are generally excluded from the computing-process flow 110. For example, when steps of the computing-process flow 110 are implemented, the computing devices 118 are not generally queried for provider objects. While in certain examples, the computing devices 118 may provide certain provider objects that may be combined with provider objects provided by the provider systems 102, the computing devices 118 may not generally provide provider objects that are solely provided in the computing-process flow 110.

Figure 2:
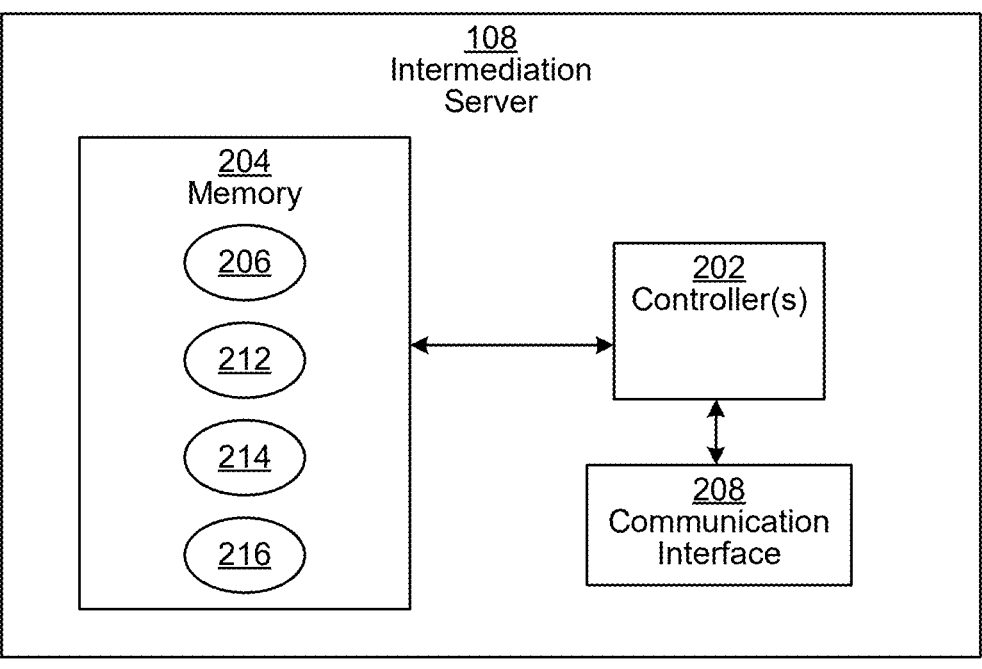
FIG. 2 depicts an intermediation server for controlling operation of a client device, according to non-limiting examples.

Turning to FIG. 2, before discussing the functionality of the system 100 in greater detail, certain components of the intermediation server 108 will be discussed in greater detail. While depicted as one device, the intermediation server 108 may comprise one or more computing devices and/or one or more cloud computing devices that may be geographically distributed.

As shown in FIG. 2, the intermediation server 108 includes at least one controller 202, such as a central processing unit (CPU) or the like. The controller 202 is interconnected with a memory 204 storing an application 206, the memory 204 implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 are generally comprised of one or more integrated circuits (ICs).

The controller 202 is also interconnected with a communication interface 208, which enables the intermediation server 108 to communicate with the other computing devices of the system 100 (i.e. the provider systems 102 and the client device 104) via the network 106, though it is understood such communication may occur locally when components of the system 100 are combined. The communication interface 208 therefore may include any necessary components (e.g., network interface controllers (NICs), radio units, and the like) to communicate via the network 106. The specific components of the communication interface 208 may be selected based on upon the nature of the network 106 and/or local communication between components of the system 100, and the like. The intermediation server 108 may also include input and output devices connected to the controller 202, such as keyboards, mice, displays, and the like (not shown).

The components of the intermediation server 108 mentioned above may be deployed in a single enclosure, or in a distributed format. In some examples, therefore, the intermediation server 108 includes a plurality of processors, either sharing the memory 204 and communication interface 208, or each having distinct associated memories and communication interfaces. As such, it is understood that the memory 204, and/or a portion of the memory 204, may be internal (e.g., as depicted) or external to the intermediation server 108; regardless, the controller 202 is understood to have access to the memory 204.

The memory 204 also stores a plurality of computer-readable programming instructions, executable by the controller 202, in the form of various applications, including the application 206. As depicted, the memory 204 may store further applications 212, 214, 216 which may respectively correspond to instructions for implementing the engines 112, 114, 116. While the applications 212, 214, 216 are depicted as separate from the application 206, in some examples the applications 206, 212, 214, 216 may be combined in any suitable manner.

As will be understood by those skilled in the art, the controller 202 executes the instructions of the application 206 (and any other suitable applications 212, 214, 216) in order to perform a set of operations defined by the instructions contained therein including, but not limited to, the blocks of a method described with respect to FIG. 5 and/or the blocks of a method described with respect to FIG. 6. In the description below, the controller 202, and more generally the intermediation server 108, and/or the engines 112, 114, 116 are understood to be configured to perform those actions. It will be understood that they are so configured via the execution (by the controller 202) of the instructions of the applications stored in the memory 204. Put another way, the intermediation server 108 may comprise a computer-readable storage medium (e.g., a non-transitory computer-readable storage medium, such as the memory 204) having stored thereon program instructions that, when executed by the controller 202, causes the controller 202 to perform a set of operations comprising the blocks of the method described with respect to FIG. 5; and/or the intermediation server 108 may comprise a computer-readable storage medium (e.g., a non-transitory computer-readable storage medium, such as the memory 204) having stored thereon program instructions that, when executed by the controller 202, causes the con- troller 202 to perform a set of operations comprising the blocks of the method described with respect to FIG. 6.

While structure of the provider systems 102, the client device 104 and the computing devices 118 is not described in detail, the provider systems 102, the client device 104 and the computing devices 118 are understood to have a similar structure as the intermediation server 108, but adapted for respective functionality of the provider systems 102, the client device 104 and the computing devices 118. In a particular example, the client device 104 is understood to comprise, and/or have access to, a display screen and an input device (e.g., see FIG. 4); similarly, a controller of the client device 104 is understood to implement a client-side portion 110-1 of the computing-process flow 110.

Figure 3:
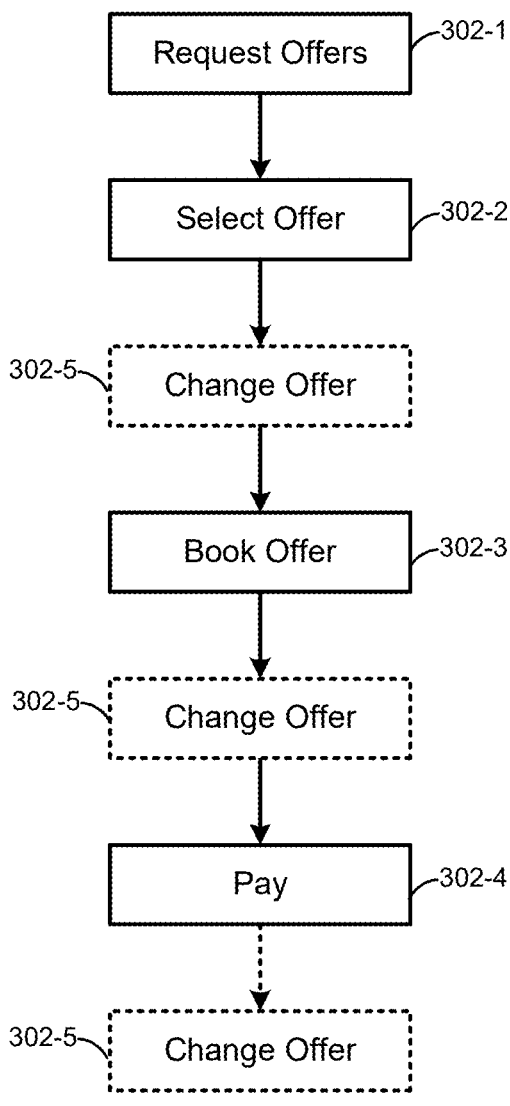
FIG. 3 depicts a computing-process flow implemented at a client device of the system of FIG. 1, according to non-limiting examples.

Attention is next directed to FIG. 3 which depicts a block diagram of an example of the computing-process flow 110. While the example computing-process flow 110 is depicted in the form of a flow chart, it is understood that the example computing-process flow 110 (e.g., hereafter the computing-process flow 110) shows steps of an API that include steps 302-1, 302-2, 302-3, 302-4, and an optional one or more steps 302-5. The steps 302-1, 302-2, 302-3, 302-4, 302-5 are hereafter interchangeably referred to, collectively, as the steps 302 and, generically, as a step 302. This convention will be used throughout the present specification.

Furthermore, the term "steps" as used herein, may be understood to include steps of the computing-process flow 110 that are implemented at the client device 104 when the client device 104 implements the computing-process flow 110, for example according to a given standard. Continuing with a travel industry example, as depicted, the computing-process flow 110 represents steps 302 for: requesting (e.g., the step 302-1) offers for flights (e.g., provider objects); selecting (e.g., the step 302-2) an offer of a flight (e.g., a provider object) to be booked; booking (e.g., the step 302-3) a selected offer of a flight (e.g., a provider object); and paying (e.g., the step 302-4) for the selected offer of a flight (e.g., a provider object) that is being booked.

At an optional change offer step 302-5 (e.g., with such optionality indicated by instances the steps 302-5 depicted in broken lines), the offer may be changed, and the optional change offer step 302-5 may be available at, and/or after, any of the select offer step 302-2, the book offer step 302-3, and the pay step 302-4.

Hence, in particular, each of the steps 302 must be implemented to book an offer of a flight (e.g., book a seat on a flight), in the depicted order (other than the change offer step 302-5 which may be implemented at and/or after any suitable step 302 of the computing-process flow 110).

Furthermore, it is understood that a step 302 may be further associated with a respective GUI that may be rendered at a display screen associated with the client device 104.

For example, at the step 302-1, a user of the client device 104 may enter criteria at data fields of a GUI used for searching for offers of flights, such as a date for a flight, a departure airport, an arrival airport, among other possibilities flight to book; the criteria may be provided to the intermediation server 108, and to the provider systems 102, which may return respective offers of flights that meet the criteria.

Similarly, at the step 302-2, a list of offers of the flights returned by the provider systems 102 may be provided in a GUI at a display screen, and from which a user of the client device 104 may select a flight to book, and from which a user of the client device 104 may select electronic buttons, and the like to add a service to an offer, such as a pickup service.

Similarly, at the step 302-3, information for a selected flight may be provided in a GUI at a display screen, and from which a user of the client device 104 may select electronic buttons to add personal information, book the flight, and/or to add a service to a booking, such as a pickup service, and the like.

Similarly, at the step 302-4, fields for entering payment information, such as credit card information, to pay for a selected flight being booked may be provided in a GUI at a display screen.

Similarly, at a step 302-5, any suitable information of a selected flight may be changed, and fields for changing such suitable information may be provided in a GUI at a display screen. Furthermore, such information that may be changed may depend at which step 302 the step 302-5 is being implemented (e.g., and/or after at which step 302 the step 302-5 is being implemented). For example, before and after a flight is booked and paid for, an airline may have restrictions on what can be changed in the booking, and fields for information that can be changed may be provided accordingly at the GUI. Such a GUI for the step 302-5 may be combined with any suitable GUI of the other steps 302.

Figure 4:
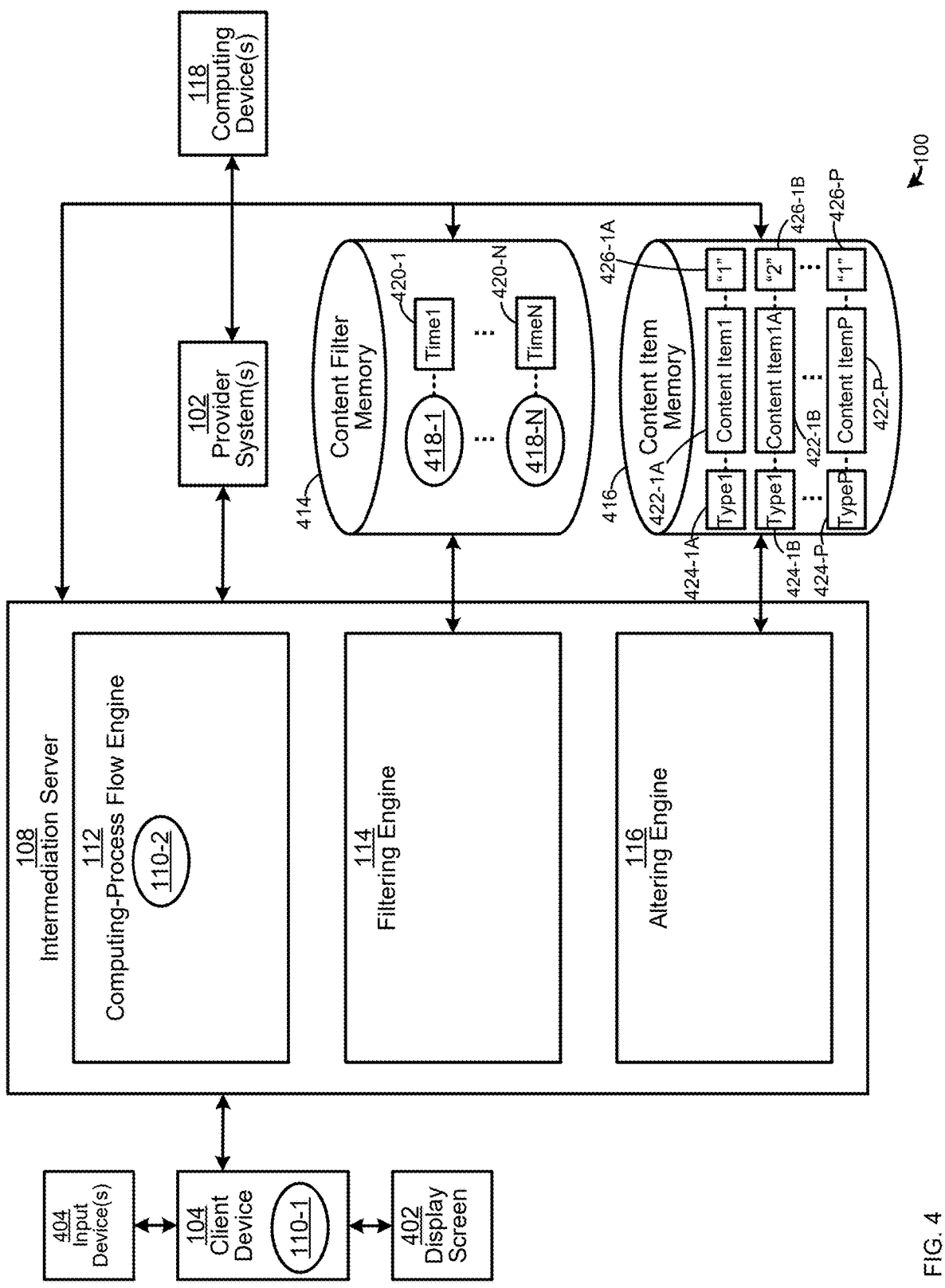
FIG. 4 depicts the system of FIG. 1 in further detail, according to non-limiting examples.

Attention is now directed to FIG. 4, which depicts aspects of one example of the system 100 that includes one or more provider systems 102 (for simplicity interchangeably referred to hereafter as the provider system 102), a client device 104, the intermediation server 108, and one or more computing devices 118 (for simplicity interchangeably referred to hereafter as the computing device 118). While the network 106 is not depicted, it is nonetheless understood to be present. For example, communication links between components of the system 100 are depicted in FIG. 4, and throughout the present specification, as double-ended arrows between respective components; the communication links may include any suitable combination of wireless and/or wired links and/or wireless and/or wired communication networks including, but not limited to, the network 106.

The intermediation server 108 is in communication with the client device 104, and the provider system 102 (e.g., which, may include, but is not limited to, a servers (or a combinations of servers and/or cloud computing devices). In some examples, the provider system 102 may be operated by an airline. As depicted, the one or more computing devices 118 are optionally in communication with the provider system 102.

Furthermore, as depicted, the client device 104 is in communication with one or more input devices 402, such as any suitable combination of a keyboard, a pointing device (e.g., a mouse), a voice recognition device, and the like, and a display screen 404. While only one provider system 102 and one client device 104 is depicted, the system 100 may comprise any suitable respective numbers of provider systems 102 and client devices 104.

Also depicted in FIG. 4, the client device 104 is implementing the client-side portion 110-1 of the computing-process flow 110, the intermediation server 108 is implementing the engines 112, 114, 116, and, in particular, the computing-process flow engine 112 is implementing the server-side portion 110-2 of the computing-process flow 110.

As also depicted in FIG. 4, the system 100 may further comprise a content filter memory 414, accessible by the filtering engine 114, and a content item memory 416, accessible by the altering engine 116. While as depicted the memories 414, 416 may be in the form of respective databases, the memories 414, 416 may be in any suitable format.

Furthermore, while the memories 414, 416 are depicted as separate from one another, the memories 414, 416 may be combined, or at least partially combined, in any suitable manner. Furthermore, while the memories 414, 416 are depicted as separate from the intermediation server 108, the memories 414, 416 may be combined, or at least partially combined, with a memory of the intermediation server 108 including, but not limited to, the memory 204. Hence, the memories 414, 416 and the intermediation server 108 may be combined in any suitable manner.

As depicted, the one or more computing devices 118 may be in communication with the memories 414, 416, such that the one or more computing devices 118 may populate the memories 414, 416 with respectively, with computer-code content filters and content items, as described herein. For example, the intermediation server 108 and one or more of the computing devices 118 may participate in a registration process where the intermediation server 108 grants authorization to the one or more of the computing devices 118 to populate one or more of the memories 414, 416, respectively, with computer-code content filters and content items as described herein. In these examples, such a registration process may also provide the one or more of the computing devices 118 with authorization to provide content items of certain priorities as described herein.

Alternatively, or in addition, as also depicted, the one or more computing devices 118 may be in communication with one or more of the memories 414, 416 via the intermediation server 108. For example, a communication link between the one or more computing devices 118 and the intermediation server 108 is also depicted.

As depicted, the provider system 102 may be in communication with one or more of the memories 414, 416 via respective communication links, and/or via the intermediation server 108. Similarly, while communication links between the client device 104 and the memories 414, 416 are not depicted for simplicity, the client device 104 may be in communication with one or more of the memories 414, 416 via respective communication links, and/or via the intermediation server 108 (e.g., as depicted). The aforementioned registration process may be implemented for the provider systems 102 and/or the client device 104.

As depicted, the content filter memory 414 stores a plurality of computer-code content filters 418-1 . . . 418-N, which, for simplicity, are interchangeably referred to hereafter, collectively, as the computer-code content filters 418 and, generically, as a computer-code content filter 418. This convention will be used elsewhere in the present specification. For example, as depicted, the computer-code content filters 418 may be stored with respective timestamps 420-1 . . . 420-N (e.g., timestamps 420 and/or a timestamp 420), indicating when a respective computer-code content filter 418 was received and/or generated, and/or populated at the content filter memory 414, the like. However, the timestamps 420 may be optional. Associations between the computer-code content filters 418 and respective timestamps 420 are indicated via broken lines therebetween; this convention will be used throughout the present specification.

As depict an "N" number of computer-code content filters 418, and associated timestamps 420 are depicted, and "N" may be any suitable number, such as one computer-code content filter 418, tens, hundreds, thousands, etc. of computer-code content filters 418, and the like.

A computer-code content filter 418 may be populated at the content filter memory 414 by one or more of the computing devices 118. One or more of the computer-code content filters 418 may be optionally populated at the content filter memory 414 by one or more of the provider systems 102, one or more client devices 104, and/or the intermediation server 108.

Furthermore, one or more of the computer-code content filters 418 may be generated by one or more of the computing devices 118 and provided to the intermediation server 108, which may receive the one or more of the computer-code content filters 418, which may populate the content filter memory 414 by the intermediation server 108 with the one or more of the computer-code content filters 418. Alternatively, or in addition, one or more of the computer-code content filters 418 may be generated by one or more of the computing devices 118, and populated at the content filter memory 414 by one or more of the computing devices 118 via a respective communication link therebetween.

Optionally, one or more of the computer-code content filters 418 may be generated by one or more of a provider system 102 and the client device 104, received at the intermediation server 108 and populated at the content filter memory 414 by the intermediation server 108. Alternatively, or in addition, one or more of the computer-code content filters 418 may be generated by one or more of a provider system 102 and the client device 104 (e.g., when a client device 104 is operated by a travel agency, and the like), and respectively populated at the content filter memory 414 by the provider system 102 and/or the client device 104. Alternatively, or in addition, one or more of the computer-code content filters 418 may be generated the intermediation server 108 and populated at the content filter memory 414 by the intermediation server 108.

In general, a computer-code content filter 418 may comprise computer code (e.g., in any suitable format and/or computer language, which may include, but is not limited to, XML (Extensible Markup Language), SQL (Structured Query Language), Python™, JavaScript, C++, amongst other possibilities, and the like) that, when executed by the filtering engine 114, causes the filtering engine 114 to compare provider objects received from the provider system 102 (which may include provider objects from the computing device 118) against conditions defined by the computer-code content filter 418.

When a provider object meets conditions defined by a computer-code content filter 418, the provider object may pass the computer-code content filter 418; conversely, when a provider object does not meet conditions defined by a computer-code content filter 418, the provider object may fail the computer-code content filter 418.

However, a computer-code content filter 418 may define negative conditions or positive conditions for passing or failing.

For example, a computer-code content filter 418 may define conditions that a provider object is to meet in order to pass. If the provider object does meet those conditions, the provider object may pass the computer-code content filter 418. Conversely, if the provider object does not meet those conditions, the provider object may fail the computer-code content filter 418.

However, a computer-code content filter 418 may alternatively define conditions that a provider object is to meet in order to fail. If the provider object does meet those conditions, the provider object may fail the computer-code content filter 418. Conversely, if the provider object does not meet those conditions, the provider object may pass the computer-code content filter 418.

Using a travel industry example, a computer-code content filter 418 may be generated by a computing device 118 operated by a government entity and/or regulator entity tasked with enforcing embargoes on certain countries. In such an example, the computer-code content filter 418 may indicate a particular airline operated by a country on which an embargo has been placed, and that provider objects offered by such an airline (e.g., which may operate a provider system 102), and/or that include flight portions operated by such an airline, fail the computer-code content filter 418 (e.g., when requested by client devices 104 located within a jurisdiction of the government entity regulator entity that provided the computer-code content filter 418 associated with an embargo). Such a computer-code content filter 418 may be an example of a negative computer-code content filter 418. Put another way, such a computer-code content filter 418 may comprise a black list of one or more airlines, such that, when provider objects are offered by such one or more airlines (e.g., which may operate respective provider systems 102), and/or that include flight portions operated by such one or more airlines, the provider objects fail the computer-code content filter 418 (e.g., when requested by client devices 104 located within a jurisdiction of the government entity regulator entity that provided the computer-code content filter 418 associated with an embargo). However, when provider objects are not offered by such one or more airlines, and/or do not include flight portions operated by one or more such airlines, the provider objects pass the computer-code content filter 418.

Conversely, a computer-code content filter 418 may indicate a list of one or more airlines operated by countries on which embargoes have not been placed, and that provider objects offered by such one or more airlines (e.g., which may operate respective provider systems 102) pass the computer-code content filter 418. Such a computer-code content filter 418 may be an example of a positive computer-code content filter 418. Put another way, such a computer-code content filter 418 may comprise a white list of one or more airlines, such that, when provider objects are offered by such one or more airlines (e.g., which may operate respective provider systems 102), the provider objects pass the computer-code content filter 418. However, when provider objects are not offered by such one or more airlines the provider objects fail the computer-code content filter 418 (e.g., when requested by client devices 104 located within a jurisdiction of the government entity regulator entity that provided the computer-code content filter 418 associated with an embargo).

In another example, an entity operating the computing device 118 may have a relationship with an entity operating a provider system 102 and/or an entity operating the intermediation server 108. Such an entity operating the computing device 118 may offer certain provider objects representing goods or services which may be combined with provider objects offered by a provider system 102. For example, a given provider object may be generated that represents a combination of a first provider object (e.g., a first component of the given provider object) offered by a provider system 102 and a second provider object (e.g., a second component of the given provider object) offered by a computing device 118.

Again using a travel industry example, a first provider object offered by a provider system 102 may represent a flight of a certain fare class for a particular user of a client device 104 who may be of a certain age. A second provider object offered by a computing device 118 may represent a glass of a luxury alcohol when boarding a plane (e.g., of the flight represented by the first provider object). A given provider object that combines the first provider object and the second provider object may be generated by the intermediate sever 108, and/or such a given provider object may be generated by the provider system 102 that offers the first provider object (e.g., in communication with the computing device 118 that offers the second provider object).

Continuing with this example, a first computer-code content filter 418 may represent a condition that alcohol is only to be served to users over a certain age for a given country, such as 21 years old, and may be generated by a government entity and/or regulator entity which enforces drinking age rules for that given country. Hence, when the client device 104 has indicated (e.g., during implementation of any suitable step 302 the computing-process flow 110, and/or via a traveler and/or user profile and the like) that the user associated with the first provider object (e.g., operating the client device 104) is less than the certain age, and the flight of the first provider object has an origin and/or a destination that includes the given country, the second provider object that represents the glass of a luxury alcohol may fail the first computer-code content filter 418; hence the given provider object also fails the first computer-code content filter 418. However, when the client device 104 has indicated that the user associated with the first provider object (e.g., operating the client device 104) is at or over the certain age, and the flight of the first provider object has an origin and/or a destination that includes the given country, the second provider object that represents the glass of a luxury alcohol may pass the first computer-code content filter 418; hence the given provider object also passes the first computer-code content filter 418.

Continuing with this example, a second computer-code content filter 418 may represent a condition that the second provider object is only to be combined with first provider objects representing flights offered by certain airlines (e.g., operating respective provider systems 102) that have a specific relationship (e.g., an official partner relationship and/or a partnering business relationship) with the entity associated with the second provider object (e.g., operating a computing device 118). The second computer-code content filter 418 may be generated by the entity operating the computing device 118, and that offers the luxury alcohol. Put another way, an entity operating the computing device 118 offering the luxury alcohol may have a relationship with certain airlines operating certain provider systems 102, and the second computer-code content filter 418 may indicate that the glass of luxury alcohol is only to be offered on such certain airlines. Put yet another way, the second computer-code content filter 418 may comprise a white list of one or more airlines offering flights on which the luxury alcohol is to be served. Hence, when the first provider object of the given provider object indicates that the flight of the first provider object is not offered by one of the airlines on the white list, the second provider object that represents the glass of a luxury alcohol may fail the second computer-code content filter 418; hence the given provider object also fails the second computer-code content filter 418. However, when the first provider object of the given provider object indicates that the flight of the first provider object is offered by one of the airlines on the white list, the second provider object that represents the glass of a luxury alcohol may pass the second computer-code content filter 418; hence the given provider object also pass the second computer-code content filter 418. In some examples, rather than a white list of one or more airlines on which a glass of luxury alcohol is to be offered, a computer-code content filter 418 may indicate a black list of one or more airlines on which a glass of luxury alcohol is not to be offered.

Continuing with this example, a third computer-code content filter 418 may represent a condition that the second provider object is only to be combined with first provider objects representing certain fare classes, such as business class or first class. The third computer-code content filter 418 may be generated by the entity operating the computing device 118 offering the luxury alcohol, an entity (e.g., an airline) operating the provider system 102 offering flights, or an entity operating the intermediation server 108. Put another way, any of the entities operating the computing device 118, the provider system 102 or the intermediation server 108 may indicate that the glass of luxury alcohol is only to be offered on such certain fare classes. Put yet another way, the third computer-code content filter 418 may comprise a white list of one or more fare classes on which the luxury alcohol is to be served. Hence, when the first provider object of the given provider object is indicative of a seat, on a flight, of a fare class on the white list, the second provider object that represents the glass of a luxury alcohol may pass the third computer-code content filter 418; hence the given provider object also passes the third computer-code content filter 418. However, when the first provider object of the given provider object is indicative of a seat, on a flight, of a fare class that is not on the white list, the second provider object that represents the glass of a luxury alcohol may fail the third computer-code content filter 418; hence the given provider object also fails the third computer-code content filter 418. In some examples, rather than a white list of one or more fare classes on which a glass of luxury alcohol is to be offered, computer-code content filter 418 may indicate a black list of one or more fare classes on which a glass of luxury alcohol is not to be offered.

While specific examples of a computer-code content filter 418 are provided herein, such examples are understood not to be exhaustive and may be represent any suitable conditions that a provider object may pass or fail.

Furthermore, it is understood that certain computer-code content filters 418 may be relevant only to certain types of provider objects. For example, a computer-code content filter 418 indicating a drinking age may not strictly be relevant to a provider object representing a flight; in such examples, where an indeterminate outcome occurs when applying a computer-code content filter 418 to a provider object, the provider object is understood to pass the computer-code content filter 418.

When the computing-process flow 110 is being implemented and the intermediation server 108 receives search criteria from the client device 104, and responsively receives provider objects that meets the search criteria (e.g., from one or more of the provider systems 102), the filtering engine 114 may filter the provider objects using the computer-code content filters 418. In particular, when a given provider object fails to pass all the computer-code content filters 418, the filtering engine 114 may remove the given provider object from the provider objects, to generate filtered provider objects, and provide the filtered provider objects to the client device 104, for example in response to receiving the search criteria from the client device 104.

While in some examples, a computing device 118 (and/or a provider system 102 and/or a client device 104) may generate computer code of a computer-code content filter 418, in other examples, a computing device 118 (and/or a provider system 102 and/or a client device 104) may provide, to the intermediation server 108, an indication of conditions which are to be incorporated into a corresponding computer-code content filter 418, and the intermediation server 108 may generate the corresponding computer-code content filter 418. For example, the intermediation server 108 may provide a GUI (e.g., via a web browser, and the like) to a computing device 118 (and/or a provider system 102 and/or a client device 104), the GUI comprising one or more fields for receiving input, and the like, which define conditions for a corresponding computer-code content filter 418. The intermediation server 108 may receive input from such fields and convert such input to a corresponding computer-code content filter 418. Using the example of drinking age for certain countries, such a GUI may include a field for entering a certain drinking age, and one or more fields for entering countries for which the certain drinking age applies, and the intermediation server 108 may convert the input to such fields into XML code, and the like (e.g., XML code, SQL code, Python™ code, JavaScript code, C++ code, amongst other possibilities) to generate a corresponding computer-code content filter 418.

For example, such a corresponding computer-code content filter 418 may include a condition of: when a traveler to, or from, country "United States" is under "21", fail a provider object associated with offering alcohol. In these examples it is understood that if a traveler associated with a provider object, associated with offering alcohol, is under "21", the provider object fails the corresponding computer-code content filter 418, otherwise the provider object passes the corresponding computer-code content filter 418. In examples where a provider object represents a flight, such a provider object would pass such a corresponding computer-code content filter 418 as such a corresponding computer-code content filter 418 is specifically directed to offering alcohol.

However, such a corresponding computer-code content filter 418 may alternatively include a condition of: when a traveler to, or from, country "United States" is at or over "21", pass a provider object associated with offering alcohol. In these examples, it is understood that if a traveler associated with a provider object associated with offering alcohol is at or over "21", the provider object passes the corresponding computer-code content filter 418, otherwise the provider object fails the corresponding computer-code content filter 418. In these examples, where a provider object represents a flight, such a provider object would pass such a corresponding computer-code content filter 418 as such a corresponding computer-code content filter 418 is specifically directed to offering alcohol.

In some examples, an entity operating a computing device 118 (and/or a provider system 102 and/or a client device 104) may delegate use of the aforementioned GUI (e.g., for defining conditions for a corresponding computer-code content filter 418) to the intermediation server 108, for example so that employees of an entity operating the intermediation server 108 may use the GUI to enter conditions for a corresponding computer-code content filter 418. For example, an employee of an entity operating a computing device 118 (and/or a provider system 102 and/or a client device 104) may communicate (e.g., a via a message, an email, a verbal conversation, and the like) with an employee of an entity operating the intermediation server 108 to convey conditions for a corresponding computer-code content filter 418 (e.g., a drinking age, etc.) and the employee of the entity operating the intermediation server 108 may interact with the GUI to enter such conditions to generate a corresponding computer-code content filter 418.

Turning now to the optional timestamps 420, a timestamp 420 may be in any suitable format, and may include a date and time that a respective computer-code content filter 418 was received and/or generated and/or populated at the content filter memory 414. For example, as depicted, the timestamp 420-1, also labelled "Time1", may indicate a date and time that the computer-code content filter 418-1 was received and/or generated and/or populated at the content filter memory 414, and the timestamp 420-N, also labelled "TimeN", may indicate a date and time that the computer-code content filter 418-N was received and/or generated and/or populated at the content filter memory 414. The timestamps 420 may be used to generating reports indicative of when provider object were provided to the client device 104 relative to the respective timestamps 420. Generating of such a report may be part of an audit process of provider objects associated with payments during implementation of the computing-process flow 110 (e.g., an audit of provider objects for which the pay step 302-4 was implemented). Such an audit process may be used to show that, at a time that a particular provider object was provided to a client device 104, the particular provider object passed all the available computer-code content filters 418.

For example, when a new computer-code content filter 418 is populated at the content filter memory 414, the filtering engine 114 and/or the intermediation server 108 may compare provider objects previously provided to the client device 104 (and/or other client devices 104), and which passed all the previously populated computer-code content filters 418, with the new computer-code content filter 418. The filtering engine 114 and/or the intermediation server 108 determine whether such previously provided provider objects pass or fail the new computer-code content filter 418 and generate a corresponding report. Such a report may, however, be generated periodically and/or at any suitable time period, and the timestamps 420 may be used to determine whether or not a previously provided provider object was compared to a respective computer-code content filter 418, for example by comparing a time that a previously provided provider object was provided to a client device 104 relative to the timestamps 420.

In particular, when a time that a previously provided provider object was provided to a client device 104 is prior to a timestamp 420 of a respective computer-code content filter 418, the filtering engine 114 and/or the intermediation server 108 determines that the previously provided provider object has not been compared to the respective computer-code content filter 418, and a comparison may then occur, and a report generated accordingly. Conversely, when a time that a previously provided provider object was provided to a client device 104 is after a timestamp 420 of a respective computer-code content filter 418, the filtering engine 114 and/or the intermediation server 108 determines that the previously provided provider object has been compared to the respective computer-code content filter 418, and a comparison may not occur, reducing use of processing resources at the filtering engine 114 and/or the intermediation server 108.

When such a report indicates that a previously provided provider object fails a new computer-code content filter 418, the report may be provided to the client device 104 (and/or any network address associated with the previously provided provider object) that received the previously provided provider object, for example in the form of a notification and/or an alert that indicates a traveler associated with the previously provided provider object may have challenges with the previously provided provider object. In a particular example, the previously provided provider object may have new regulations applied to it that that the traveler may have to follow (e.g., such as a new embargo associated with an airline used by one or more flights of the previously provided provider object and/or a raising of a drinking age, and the like).

Turning now to the content item memory 416, the content item memory 416 respectively stores a plurality of content items 422-1A, 422-1B . . . 422-P (e.g., the content items 422 and/or a content item 422), associated with respective indications of a respective content item type 424-1A, 424-1B . . . 424-P (e.g., the types 424 and/or a type 424), and which, as depicted, may optionally be associated with indications of respective priorities type 426-1, 426-1B . . . 426-P (e.g., the priorities 426 and/or a priority 426). While not depicted, the content items 422 may also be timestamped.

As depict a "P" number of content items 422 (and associated indicators of types 424, and associated priorities 426) are depicted, and "P" may be any suitable number, such as one content item 422, tens, hundreds, thousands, etc. of content items 422, and the like.

Such content items 422 may be used to alter provider objects. Again using the example of the computing-process flow 110 being implemented, when the intermediation server 108 receives search criteria from the client device 104, and responsively receives provider objects that meets the search criteria (e.g., from one or more of the provider systems 102), the altering engine 116 may alter one or more of the provider objects using the content items 422, and provide the one or more altered provider objects to the client device 104, for example in response to receiving the search criteria from the client device 104. Such altering may include, but is not limited to, one or more of populating one or more fields of a provider object with one or more content items 422 from the content item memory 416, and/or replacing existing content items in one or more fields of a provider object with content items 422 from the content item memory 416.

For example, a provider object that is received may comprise one or more fields associated with and/or dedicated to respective content item types. In particular, such fields may be associated with metadata indicating a respective content item type. Hence, a field is understood to be associated with a respective content item type corresponding to a type 424.

The altering engine 116 may populate a field of such a provider object with a respective content item 422 of a same respective content item type 424 associated with the field, to generate an altered provider object. Alternatively, or in addition, the altering engine 116 may replace an existing content item of a field of such a provider object with a respective content item 422 of a same respective content item type 424 associated with the field, to generate an altered provider object. The altered provided object may be provided to the client device 104 in place of the provider object.

For example, the content items 422 may be received from a plurality of computing devices, including at least one computing device 118 excluded from the computing-process flow 110, though content items 422 may optionally be received from one or more of a provider system 102 and the intermediation server 108 (and/or a client device 104, for example, when a client device 104 is operated by a travel agency, and the like).

The content items 422 may be of any suitable types 424 which correspond to respective types of fields of provider objects. For example, such content items 422 and respective types 424 may include, but are not limited to, one or more of:

An image that is of an image item type 424. For example, a content item 422 may comprise an image that is of an image item type 424, and a provider object may comprise one or more fields associated with (e.g., dedicated to) image item types. For example, such an image may comprise an image of an item represented by a provider object, such as an image of an airplane, a cabin and/or a seat on an airplane, a hotel, a hotel room, a good (e.g., such as the aforementioned luxury alcohol), a service, and the like.

A video that is of a video item type. For example, a content item 422 may comprise a video that is of a video item type 424, and a provider object may comprise one or more fields associated with (e.g., dedicated to) video item types. For example, such a video may comprise a video of an item represented by a provider object, such as an airplane, a cabin and/or a seat on an airplane, a hotel, a hotel room, a good (e.g., such as the aforementioned luxury alcohol), a service, and the like.

A sound that is of an audio item type. For example, a content item 422 may comprise a sound (e.g., any suitable sound file) that is of an audio item type 424, and a provider object may comprise one or more fields associated with (e.g., dedicated to) audio item types. For example, such a sound may comprise a sound associated with an item represented by a provider object, such as an airplane, a cabin and/or a seat on an airplane, a hotel, a hotel room, a good (e.g., such as the aforementioned luxury alcohol), a service, and the like. For example, in the case of an airplane, etc., such a sound may represent an airplane taking off, or in the case of a hotel, etc., such a sound may be of a welcome message, and the like, or in the case of a good, such a sound may represent the good (e.g., the sound of the luxury alcohol being poured, and the like). Alternatively, or in addition, such a sound may comprise a theme song or theme music associated with an entity that provides provider objects, and/or any other suitable sound.

Text that is of a text item type. For example, a content item 422 may comprise text that is of a text item type 424, and a provider object may comprise one or more fields associated with (e.g., dedicated to) text item types. For example, such text may comprise text associated an item represented by a provider object, such as a phrase, and the like associated with the provider object (e.g., a trademarked phrase, and the like, or any other suitable text and/or phrase).

A review that is of a review item type. For example, a content item 422 may comprise a review that is of a review item type 424, and a provider object may comprise one or more fields associated with (e.g., dedicated to) review item types. For example, such a review may comprise a review (e.g., that may have been posted on-line, and the like) of an item represented by a provider object, such as a review of an airline, a hotel, a good, a service and the like.

A recommendation that is of a recommendation item type. For example, a content item 422 may comprise recommendation that is of a recommendation item type 424, and a provider object may comprise one or more fields associated with (e.g., dedicated to) recommendation item types. For example, such a recommendation may comprise a recommendation (e.g., that may have been posted on-line, and the like) of an item represented by a provider object, such as a recommendation of an airline, a hotel, a good, a service and the like A description that is of a description item type. For example, a content item 422 may comprise a description that is that is of a description item type 424, and a provider object may comprise one or more fields associated with (e.g., dedicated to) description item types. For example, such a description may comprise a description of an item represented by a provider object, such as a description of an airline, a hotel, a good, and the like.

A three-dimensional item that is of a three-dimensional item type. For example, a content item 422 may comprise a three-dimensional item (e.g., any suitable three-dimensional image file) that is of a three-dimensional item type 424, and a provider object may comprise one or more fields associated with (e.g., dedicated to) three-dimensional item types. For example, such a three-dimensional item may comprise a three-dimensional representation of an item represented by a provider object, such as a three-dimensional representation of airplane, a cabin and/or a seat on an airplane, a hotel, a hotel room, a good (e.g., such as the aforementioned luxury alcohol), a service and the like.

A smell item that is of an odor item type. For example, a content item 422 may comprise a smell item (e.g., any suitable smell file) that is of an odor item type 424, and a provider object may comprise one or more fields associated with (e.g., dedicated to) odor item types. For example, such a smell item may comprise a smell representation of an item represented by and/or associated with a provider object, such as a particular smell which an entity, offering a provider object, wishes to be associated with their brand. It is understood that such a smell item may be used to reproduce such a particular smell at a client device 104, presuming a client device 104 include hardware for reproducing smells from smell items (e.g., smell files), and the like.

A coordinate item that is of a coordinate item type. For example, a content item 422 may comprise a coordinate item that is of a coordinate item type 424, and a provider object may comprise one or more fields associated with (e.g., dedicated to) coordinate item types. For example, such a coordinate item may comprise coordinates (e.g., a street address and/or Global Positioning System (GPS) coordinates, and the like) of an airport where a flight of a provider object may originate, or coordinates of a hotel, or coordinates of a taxi pickup location at an origin or destination of the flight, or coordinates of a shop at a destination of the flight where a good or service may be provided and/or purchased, and the like.

An amenity item that is of an amenity item type. For example, a content item 422 may comprise an amenity item that is of an amenity item type 424, and a provider object may comprise one or more fields associated with (e.g., dedicated to) amenity item types. For example, such an amenity item may comprise a description of an amenity offered in association with provider object, such as an amenity offered on a flight, or at a hotel, or in association with a good and/or service (e.g., a free gift provided when a good and/or service is purchased, and the like).

An icon that is of an icon item type. For example, a content item 422 may comprise an icon that is of an icon item type 424, and a provider object may comprise one or more fields associated with (e.g., dedicated to) icon item types. For example, such an icon may comprise an icon associated with an item represented by a provider object, such as a logo of an airline, a hotel, a good, a service, and the like.

A label that is of a label item type. For example, a content item 422 may comprise a label that is of a label item type 424, and a provider object may comprise one or more fields associated with (e.g., dedicated to) label item types. For example, such a label may comprise a brief description of an item represented by a provider object, such as a logo of an airline, a hotel, a good, a service, and the like, which may be different from the aforementioned description and/or a shorter version of such a description.

A certificate item of a certificate item type. For example, a content item 422 may comprise a certificate item that is of a certificate item type 424, and a provider object may comprise one or more fields associated with (e.g., dedicated to) certificate item types. For example, such a certificate item may comprise an image of a certificate associated with an item represented by a provider object, such as an image of an industry certification of an airline, a hotel, a good, a service, and the like. For example, such a certificate item type may indicate that an airline, a hotel, a good, a service, and the like meets certain industry standards (e.g., an ISO (International Organization for Standardization) certification, and the like).

An award item of an award item type. For example, a content item 422 may comprise an award item that is of an award item type 424, and a provider object may comprise one or more fields associated with (e.g., dedicated to) award item types. For example, such an award item may comprise an image of an award associated with an item represented by a provider object, such as an award given to an airline, a hotel, a good, a service, and the like.

A web-page link of a web-page link item type. A web-page link that is of a web-page link item type. For example, a content item 422 may comprise a web-page link of a web-page link item type 424, and a provider object may comprise one or more fields associated with (e.g., dedicated to) web-page link item types. For example, such a web-page link item may comprise a link to web page of an airline, a hotel, a good, a service, and the like, represented by a provider object.

However, such a list is understood not to be exhaustive and any suitable content items of any suitable types are within the scope of the present specification. Furthermore, while certain content items 422 may have a similar format, it is understood that their types 424 may differ. For example, an image item, an award item and a content item may all comprise respective images, such images may be understood to be of different types 424. Similarly, while a text item, a review item, a description item, a review item, a recommendation item, an amenity item, and a label item may all comprise respective text, such text may be understood to be of different types 424.

Furthermore, it is understood that the content items 422 may be further associated with a particular provider system 102 (and/or an associated entity), or a particular computing device 118 (and/or an associated entity), and the like. Such an association may be indicated via the types 424, or via another indicator stored in association with a content item 422. For example, a type 424 may comprise an image type specifically associated with a particular provider system 102, or a particular computing device 118 (and/or an associated entity), and the like. Such an association may be indicated via the types 424, or via another indicator stored in association with a content item 422. For example, a type 424 may comprise an image type specifically associated with a particular provider system 102, or a particular computing device 118, and the like Furthermore, it is understood that the content items 422 may be further associated with a particular priority 426 which may indicate that a respective content item 422 is of a particular priority content type 424. For example, as depicted, there are two different priorities 426 of "1" (e.g., of priorities 426-1A, 426-P) and "2" (e.g., of priority 426-1B). In this example a priority 426 of "1" may be of higher priority than a priority 426 of "2", though there may be any suitable number of priorities 426 (e.g., a priority 426 of "3", a priority 426 of "4", etc., with "1" being a highest priority, etc.). In the depicted example, it is understood that the content item 422-1A of a type 424-1A and a priority 426-1A of "1" is a higher priority content type than the content item 422-1B of a type 424-1B and a priority 426-1B of "2". It is understood that rather than include separate indications of a priority type of a content item 422, such priority 426 may be incorporated into the indications of type 424.

Furthermore, more than one content item 422 may be associated with a particular type 424, and the like. For example, as depicted content item 422-1A (e.g., also labelled "Content Item1" is associated with the indicator of the type 424-1A, and content item 422-1B (e.g., also labelled "Content Item1A" is associated with the indicator of the type 424-1B. However, both types 424-1A, 424-1B are of "Type1", and hence both the types 424-1A, 424-1B may be a same content item type (e.g., such as an image type), which may be interchangeably referred to as type 424-1. Hence, the content items 422-1A, 422-1B are both of a "Type1" type 424-1.

However, as indicated the two types 424-1 may be different priority content types as indicated by the respective priorities 426-1A, 426-1B. For example, the content item 422-1A may be of a higher priority image type, and the content item 422-1B may be of a lower priority image type, though both content items 422-1A, 422-1B may be image types.

Fields of provider objects may hence be associated with and/or dedicated to content item types that may comprise content items 422 of certain formats (e.g., images, video, text, etc.), and/or certain priorities (e.g., "1", "2", etc.), and the like. In some examples, fields may also be associated limits on numbers of content items 422 and/or limits on numbers of types of contents items (e.g., a field may be configured to accept one, or more than one, content item 422 of a same or different content items item types, such as, in a particular example, up to a maximum of five image items and only one description item). For simplicity, hereafter, reference will be made hereafter to fields associated with respective content item types which may include, but is not limited to fields dedicated to respective content item types.

For example, when a provider object is received at the intermediation server 108 (and/or the altering engine 116) that has a field associated with a given content item type of "Type 1", then a content item 422-1A or content item 422-1B may be used to populate the field, or replace an existing content item in the field.

In some examples, more than one content item 422 of a given content item type may be used to populate a field, and the field may indicate, in any suitable manner, how many content items 422 of the given content item type may be used to populate the field, such as two content items, three content items, and like, and or 100% of available content items 422 of the given content item type, or 80% of available content items 422 of the given content item type, or 80% of available content items 422 of the given content item type, and the like. Put another way, a field may indicate, in any suitable manner (e.g., using percentages, fractions, and the like) a distribution of available content items 422 of the given content item type may be used to populate the field.

For example, a field may indicate that 100% of content items 422 of "Type1" may be used to populate the field and both content items 422-1A, 422-1B may be used to populate the field.

In another example, a field may indicate that 100% of content items 422 of content types 424 having a priority of "1" may be used to populate the field and both content items 422-1A, 422-P may be used to populate the field.

In yet further examples, a provider object may be received that includes fields associated with content types of different given priorities. In these examples, fields associated with a given priority of "1" may be populated by content items 422 having a priority 426 of "1", fields associated with a given priority of "2" may be populated by content items 422 having a priority 426 of "2", etc. Furthermore, such fields may indicate a number of available content items 422 and/or a distribution of available content items 422 that may be used to populate the fields.

When a number of available content items 422 of a given content type is less than that indicated by a field, all of the available content items 422 of the given content type is may be used to populate the field.

However, when a field is restricted to only one content item 422, the priorities 426 may be used to determine which content item 422 is to populate the field.

For example, a field may indicate that one of content item 422 of "Type1" may be used to populate the field and as the content item 422-1A has a higher priority 426-1A of "1", than the priority 426-1B of the content item 422-1B, the content item 422-1A may be used to populate the field.

In such examples, it is understood that both a field, and content items 422 used to populate the field may be associated with particular entities. For example, a provider object may be received with a field associated with an entity that operates a computing device 118, and, both content items 422-1A, 422-1B may be associated with the same entity. However, the first content item 422-1A may be provided by the entity that operates the computing device 118, and the second content item 422-1B may be provided by an entity that operates a provider system 102. As such, the first content item 422-1A may be used to populate the field, rather than the second content item 422-1B, due to the first content item 422-1A having been received from the entity that operates the computing device 118. In these examples, the types 424-1A, 424-1B may indicate an origin of the content items 422-1A, 422-1B.

Alternatively, or in addition, the first content item 422-1A may be assigned a higher priority 426-1A than a priority 426-1B of the second content item 422-1B, due to the first content item 422-1A having been received (e.g., via the computing device 118) from an entity that operates the computing device 118 and the second content item 422-1B having been received (e.g., via the provider system 102) from an entity that operates the provider system 102. In these examples, the field may be populated based on the priorities 426-1A, 426-1B and hence the first content item 422-1A may be used to populate the field rather than the second content item 422-1B due to the higher priority 426-1A.

Returning to the computer-code content filters 418, attention is now directed to FIG. 5 which depicts a flowchart representative of a method 500 a method for filtering provider objects from one or more provider systems. The operations of the method 500 of FIG. 5 correspond to machine readable instructions that are executed by the intermediation server 108, and specifically the controller 202 of the intermediation server 108. In the illustrated example, the instructions represented by the blocks of FIG. 5 are stored at the memory 204 for example, as the applications 206, 212, 214. The method 500 of FIG. 5 is one way in which the system 100 and/or the intermediation server 108 and/or the filtering engine 114 and/or the controller 202 may be configured. Furthermore, the following discussion of the method 500 of FIG. 5 will lead to a further understanding of the system 100, and its various components.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1 and FIG. 4, as well.

Furthermore, the method 500 of FIG. 5 will be described with respect to the example of the system 100 depicted in FIG. 4.

At a block 502, the controller 202, and/or the intermediation server 108, implements a computing-process flow 110 associated with a client device 104 and one or more provider systems 102.

At a block 504, the controller 202, and/or the intermediation server 108, receives (e.g., via the communication interface 108), from the client device 104, during implementation of the computing-process flow 110, search criteria.

At a block 506, the controller 202, and/or the intermediation server 108, receives (e.g., via the communication interface 108), during implementation of the computing-process flow 110, provider objects that meet the search criteria, the provider objects associated with the one or more provider systems 102.

The blocks 502, 504, 506 may be implemented via the computing-process flow engine 112.

At a block 508, the controller 202, and/or the intermediation server 108, applies computer-code content filters 418 to the provider objects, the computer-code content filters 418 received from one or more computing devices 118 excluded from the computing-process flow 110.

At a block 510, when a given provider object fails to pass all the computer-code content filters 418, the controller 202, and/or the intermediation server 10, removes the given provider object from the provider objects, to generate filtered provider objects. In some examples, the blocks 508, 510 may be implemented by the filtering engine 114.

The blocks 508, 510 may be implemented via the filtering engine 114, and the computing-process flow 110 may be paused and/or interrupted to perform the blocks 508, 510.

At a block 512, the controller 202, and/or the intermediation server 108, provides (e.g., via the communication interface 108), during implementation of the computing-process flow 110, the filtered provider objects to the client device 104.

The block 512 may be implemented via the computing-process flow engine 112, which may resume and/or unpause the computing-process flow 110 after the block 510.

The method 500 may include any other suitable features and/or aspects.

In some examples, the method 500 may further comprise the controller 202, and/or the intermediation server 108: prior to implementing the computing-process flow 110, receiving the computer-code content filters 418 from the one or more computing devices 118 excluded from the computing-process flow 110; and storing the computer-code content filters 418 at a memory (e.g., such as the content filter memory 414, the memory 204, and/or any other suitable memory), and applying (e.g., at the block 508) the computer-code content filters 418 to the provider objects comprises: accessing the computer-code content filters 418 at the memory which may include, but is not limited to, retrieving the computer-code content filters 418 from the memory.

In some examples, the method 500 may further comprise the controller 202, and/or the intermediation server 108: prior to implementing the computing-process flow 110, receiving indications of the computer-code content filters 418 from the one or more computing devices 118 excluded from the computing-process flow 110; converting the indications to the computer-code content filters 418; and storing the computer-code content filters 418 at a memory (e.g., such as the content filter memory 414 and/or the memory 204 and/or another memory). Hence, for example, the indications may indicate conditions that are to be incorporated into a computer-code content filter 418, and a computer-code content filter 418 may be generated accordingly, for example by the intermediation server 108.

In some examples, the method 500 may further comprise the controller 202, and/or the intermediation server 108: applying (e.g., at the block 508) the computer-code content filters 418 and further computer-code content filters 418 to the provider objects, the further computer-code content filters 418 received from one or more of the client device 104, the one or more provider systems 102 and the intermediation server 108; when the given provider object fails to pass all of the computer-code content filters 418 and the further computer-code content filters 418, removing (e.g., at the block 510) the given provider object from the provider objects, to generate the filtered provider objects; and providing (e.g., at the block 512) the filtered provider objects to the client device 104. Hence, in these example, computer-code content filters 418 may be received from both at least one computing device 118 and one or more of the client device 104, the one or more provider systems 102 and/or the intermediation server 108, and applied to a provider object accordingly.

In some examples, the method 500 may further comprise the controller 202, and/or the intermediation server 108:

failing the given provider object when a first component of the given provider object passes a given computer-code content filter 418 and a second component of the given provider object fails to pass the given computer-code content filter 418.

In these examples, a given provider object may comprise two respective provider objects, for example a first provider object (e.g., a first component) from a provider system 102 (e.g., a flight) and a second provider object (e.g., a second component) from a computing device 118 (e.g., a glass of luxury alcohol). However, both components may be received from a provider system 102 (e.g., an airline may offer glass of luxury alcohol). Hence, as has already been described, when a given computer-code content filter 418 indicates that a traveler associated with a flight represented by the first provider object is under a drinking age, the second provider object representing the glass of luxury alcohol may fail the given computer-code content filter 418 and, as such, the given provider object also fails the given computer-code content filter 418 (e.g., even when the flight of the first provider object otherwise passes all the computer-code content filters 418).

Conversely, in some examples, the method 500 may further comprise the controller 202, and/or the intermediation server 108: failing the given provider object when a first component of the given provider object fails to pass a given computer-code content filter 418 and a second component of the given provider object passes, or fails to pass, the given computer-code content filter 418.

In these examples, a given provider object may comprise two respective provider objects, for example a first provider object (e.g., a first component) from a provider system 102 (e.g., a flight) and a second provider object (e.g., a second component) from a computing device 118 (e.g., a glass of luxury alcohol). Hence, as has already been described, when a given computer-code content filter 418 indicates that a flight represented by the first provider object is offered by an airline from a country on which an embargo has been placed, the first provider object may fail the given computer-code content filter 418 and, as such, the given provider object also fails the given computer-code content filter 418 (e.g., even if the traveler is at, or over, a drinking age and/or the second provider object otherwise passes all the computer-code content filters 418).

However, in some examples, the method 500 may further comprise the controller 202, and/or the intermediation server 108: when the given provider object comprises a first component that passes a given computer-code content filter 418 and a second component that fails to pass the given computer-code content filter 418, removing the second component from the given provider object to generate an updated provider object; and adding the updated provider object to the filtered provider objects provided to the client device 104.

Hence, for example, when a given provider object comprises a first provider object (e.g., a first component) from a provider system 102 and a second provider object (e.g., a second component) from a computing device 118, and the second provider object does not pass all the computer-code content filters 418, but the first provider object does pass all the computer-code content filters 418, the second provider object may be removed from the given provider object to generate an updated provider object. Hence, returning to the example of a traveler being under a drinking age, the updated provider object may include a flight of a first provider object and/or first component, but not a glass of luxury alcohol of a second provider object and/or second component.

However, in examples where a flight of a first provider object does not pass all the computer-code content filters 418, but the glass of luxury alcohol of a second provider object does pass all the computer-code content filters 418, it would be inefficient to generate an updated provider object that included the glass of luxury alcohol but not the flight.

As such, it is understood that a given provider object may include a primary provider object and a secondary provider object dependent on a primary provider object. In such examples, when the second provider object passes all the computer-code content filters 418 but the primary provider object fails at least one computer-code content filter 418, the given provider object is understood to fail the computer-code content filters 418, and is removed, at the block 510, from the provider objects received at the block 506. Hence, in these examples, whether or not the second provider object is provided to the client device 104 depends on whether or not the primary provider object passes or fails the all the computer-code content filters 418. However, when the primary provider object passes all the computer-code content filters 418, but the secondary provider object fails at least one computer-code content filter 418, the primary provider object may still be provided to the client device 104 by generating an updated provider object that includes the primary provider object but not the secondary provider object (e.g., the second provider object is removed from the given provider object to generate the updated provider object).

An example of such a primary provider object and dependent secondary provider object of a given provider object may respectively include a primary provider object representing a flight, and a secondary provider object representing a good or service offered in conjunction with the flight, such as the aforementioned glass of luxury alcohol. Hence, when the primary provider object represents a flight that fails at least one of the computer-code content filters 418, the given provider object is removed at the block 512 (e.g., as it is nonsensical to offer a glass of luxury alcohol independent of the fight). However, when the second provider object represents a glass of luxury alcohol that fails at least one of the computer-code content filters 418, but the primary provider object represents a flight that passes all the computer-code content filters 418, an updated provider object that includes the primary provider object may be generated and provided at the block 512.

Put another way, in some examples a secondary provider object may be dependent on a primary provider object, and the method 500 may further comprise the controller 202, and/or the intermediation server 108: when the primary provider object fails to pass all the computer-code content filters 418, removing the primary provider object and the secondary provider object from the provider objects, to generate the filtered provider objects.

In some examples, such dependencies may be operational. For example, for a secondary provider object representing a glass of luxury alcohol dependent on primary provider object representing a flight, a service represented by the secondary provider object is dependent on the operational implementation of the flight represented by the primary provider object.

However, in other examples, such dependencies may be based on two entities having an agreement to combine provider objects, such as an agreement that secondary provider objects representing a hotel stay (e.g., provided by one of the entities of the agreement) are dependent on primary provider objects representing flights (e.g., provided by another of the entities of the agreement). However, similar to an operational dependency, in these examples, a service represented by the secondary provider object is dependent on the implementation of the flight represented by the primary provider object.

In some examples, the method 500 may further comprise the controller 202, and/or the intermediation server 108: prior to implementing the computing-process flow 110 (e.g., prior to the block 502), receiving the computer-code content filters 418 from the one or more computing devices 118 excluded from the computing-process flow 110; storing the computer-code content filters 418 at a memory (e.g., such as the content filter memory 414, the memory 204, and/or any other suitable memory); and applying respective timestamps 420 to the computer-code content filters 418, the respective timestamps 420 indicating when a respective computer-code content filter 418 was one or more of received, generated and populated at the memory.

In some examples, the method 500 may further comprise the controller 202, and/or the intermediation server 108: implementing an audit process for a provider object associated with a payment (e.g., at the pay step 302-4 of computing-process flow 110) during implementation of the computing-process flow 110. In particular, it is understood that such a provider object passed all the computer-code content filters 418 at the block 510, at an earlier implementation of the method 500. As such, the audit process is understood to occur after the block 512 of the method 500. The audit process may comprise: determining respective timestamps 420 of the computer-code content filters 418, the respective timestamps 420 indicative of when the computer-code content filters 418 were received from the one or more computing devices 118 excluded from the computing-process flow 110; and generating a report indicative of when the provider object was provided to the client device 104 relative to the respective timestamps.

Such a report may hence indicate that, during an earlier implementation of the method 500, a particular provider object, previously paid for and provided to a client device 104, passed all the computer-code content filters 418 that were available at that time. As such, if the particular provider object no longer passes the computer-code content filters 418 that are now available (e.g., due to a new computer-code content filters 418 being received), the intermediation server 108 may show, via the report, that the particular provider object was properly provided (e.g., not filtered) at a time of the earlier implementation of the method 500. Hence, such a report may be provided to a regulator to show previous compliance to any regulations in place at a time that a provider object was paid for, and the like.

In some examples, the method 500 may further comprise the controller 202, and/or the intermediation server 108: receiving a new computer-code content filter 418; applying the new computer-code content filter 418 to past provider objects associated with payments during previous implementations of the computing-process flow 110 (e.g., at the pay step 302-4); and when a given past provider object fails the new computer-code content filter 418, providing an alert to a network address associated with the given past provider object.

Hence, similar to generating the aforementioned report, a past provider object that passed all the computer-code content filters 418 may be later compared to a new computer-code content filter 418 and when the past provider object fails the new computer-code content filter 418, an alert may be provided to a network address associated with the past provider object, such as an email address, a telephone number, and the like, associated with a traveler to alert the traveler of the failure. While such a past provider object may not be proactively cancelled once the pay step 302-4 is implemented, the traveler may be alerted to problems with the past provider object and take remedial action, for example to contact a provider system 102 to change a flight, and the like.

Attention is now directed to FIG. 6 which depicts a flowchart representative of a method 600 a method for altering provider objects from one or more provider systems. The operations of the method 600 of FIG. 6 correspond to machine readable instructions that are executed by the intermediation server 108, and specifically the controller 202 of the intermediation server 108. In the illustrated example, the instructions represented by the blocks of FIG. 6 are stored at the memory 204 for example, as the applications 206, 212, 216. The method 600 of FIG. 6 is one way in which the system 100 and/or the intermediation server 108 and/or the altering engine 116 and/or the controller 202 may be configured. Furthermore, the following discussion of the method 600 of FIG. 6 will lead to a further understanding of the system 100, and its various components.

The method 600 of FIG. 6 need not be performed in the exact sequence as shown and likewise various blocks may be performed in parallel rather than in sequence. Accordingly, the elements of method 600 are referred to herein as "blocks" rather than "steps." The method 600 of FIG. 6 may be implemented on variations of the system 100 of FIG. 1 and FIG. 4, as well.

Furthermore, the method 600 of FIG. 6 will be described with respect to the example of the system 100 depicted in FIG. 4.

At a block 602, the controller 202 and/or the intermediation server 108 implements a computing-process flow 110 associated with a client device 104 and one or more provider systems 102.

At a block 604, the controller 202 and/or the intermediation server 108 receives, from the client device 104, during implementation of the computing-process flow 110, search criteria.

At a block 606, the controller 202 and/or the intermediation server 108 receives, during implementation of the computing-process flow 110, a provider object that meets the search criteria, the provider object associated with a provider system 102 of the one or more provider systems 102, the provider object comprising one or more fields associated with respective content item types.

The blocks 602, 604, 606 may be implemented via the computing-process flow engine 112.

At a block 608, the controller 202 and/or the intermediation server 108 populates a field of the provider object with a respective content item 422 of content items 422 for populating the one or more fields, the content items 422 received from a plurality of computing devices, including at least one computing device 118 excluded from the computing-process flow 110, the respective content item 422 being of a same respective content item type 424 associated with the field, to generate an altered provider object.

The block 608 may be implemented via the altering engine 116, and the computing-process flow 110 may be paused and/or interrupted to perform the block 608.

At a block 610, the controller 202 and/or the intermediation server 108 provides, during implementation of the computing-process flow 110, the altered provider object to the client device 104.

The blocks 610 may be implemented via the computing-process flow engine 112, which may resume and/or unpause the computing-process flow 110 after the block 608.

The method 600 may include any other suitable features and/or aspects.

For example, the method 600 may further comprise, at the block 608, the controller 202 and/or the intermediation server 108, populating the field of the provider object with the respective content item 422 by: replacing an existing content item in the field with the respective content item 422, the existing content item provided by the provider system 102 (e.g., when provided the provider object), to override the existing content item.

For example, the provider system 102 may prepopulate the field with a content item that the provider system 102 provides and/or has access to, and the controller 202 and/or the intermediation server 108 may replace that existing content item with a respective content item 422.

Alternatively, the method 600 further comprise, at the block 608, the controller 202 and/or the intermediation server 108, populating the field of the provider object with the respective content item 422 by: populating the field with the respective content item 422, the field being empty of a content item when the provider object is received.

When the provider object comprises a plurality of fields, some fields may be prepopulated and other fields may be empty, and the controller 202 and/or the intermediation server 108 may populate all the fields accordingly.

However, when a given field is prepopulated with an existing content item, and associated with a content type for which there are no content items 422 stored at the content item memory 416, no population of the given field occurs.

In some examples, the content items 422 may comprise a set of given content items 422 of the same respective content item type 424 associated with a field. For example, the content items 422-1A, 422-1B may comprise such a set of content items 422 that are of a same type 424-1. In these examples, the set of given content items 422 may include the respective content item 422 used to populate the field at the block 608. However, in these examples, the set of given content items 422 may be associated with respective priorities 426, and the method 600 may further comprise, the controller 202 and/or the intermediation server 108, populating the field of the provider object with the respective content item 422 by: selecting the respective content item 422, from the set of given content items 422, according to the respective priorities 426.

For example, the respective content item 422, selected from the set of given content items 422, may comprise the content item 422 having the highest priority 426 (e.g., of a given type 424, and the content item 422 having the highest priority 426, in this instance, does not have to have a priority 426 of "1", but rather have the highest priority 426 of all the content items 422 of the given type 424).

However, in other examples, the field may be associated with a given priority and the respective content item 422, selected from the set of given content items 422, may comprise the content item 422 associated with the same priority 426 as the field. Put another way, the method 600 may further comprise, the controller 202 and/or the intermediation server 108, populating the field of the provider object with the respective content item 422 by: selecting the respective content item 422, from the set of given content items 422, that has a same respective priority 426 as the respective priority of the field.

In other examples, the provider object received at the block 606 may comprise a plurality of the one or more fields associated with the same respective content item type, the plurality of the one or more fields including the field of the block 608. In these examples, the method 600 may further comprise, the controller 202 and/or the intermediation server 108, populating, the plurality of the one or more fields with respective content items 422, including the respective content item 422 of the block 608, of the same respective content item type 424 associated with the plurality of the one or more fields.

For example, the plurality of the one or more fields of the provider object received at the block 606, associated with the same respective content item type, may be associated with given respective priorities, and the respective content items 422 may be associated with further given respective priorities 426. In these examples, the method 600 may further comprise, the controller 202 and/or the intermediation server 108, populating, the plurality of the one or more fields with the respective content items 422 by matching the given respective priorities 426 of the respective content items 422 with the given respective priorities associated with the one or more fields.

In other examples, the plurality of the one or more fields of the provider object received at the block 606, associated with the same respective content item type, may be associated with respective distributions, such as percentages and the like. In these examples, the method 600 may further comprise, the controller 202 and/or the intermediation server 108, populating, the plurality of the one or more fields with the respective content items 422 according to the respective distributions.

Attention is next directed to FIG. 7, FIG. 8, FIG. 9, FIG. 10, FIG. 11, FIG. 12, FIG. 13, FIG. 14, FIG. 15, FIG. 16, FIG. 17, FIG. 18 and FIG. 19, which depict aspects of the method 500 and the method 600. FIG. 7, FIG. 8, FIG. 9, FIG. 10, FIG. 11, FIG. 12, FIG. 13, FIG. 14, FIG. 15, FIG. 16, FIG. 17, FIG. 18 and FIG. 19 are understood to be similar to FIG. 4, with like components having like numbers. While not all components of the system 100 are depicted in all of FIG. 7, FIG. 8, FIG. 9, FIG. 10, FIG. 11, FIG. 12, FIG. 13, FIG. 14, FIG. 15, FIG. 16, FIG. 17, FIG. 18 and FIG. 19, they may nonetheless be present.

However, it is understood that the method 500 and the method 600 may be implemented independent of each other, or in conjunction with each other. For example, when the method 500 is implemented without the method 600, using the computer-code content filters 418, the altering engine 116, the content item memory 416 and the content items 422 (e.g., as well as the types 424 and the priorities 426) may not be present in the system 100. Similarly, when the method 600 is implemented without the method 500, using the content items 422, the filtering engine 114, the content filter memory 414 and the computer-code content filters 418 (e.g., as well as the timestamps 420) may not be present in the system 100.

However, when the method 500 and the method 600 are implemented concurrently, the method 500 may be used to filter provider objects (e.g., and implemented up to the block 510), and the method 600 may be used to alter filtered provider objects, and the blocks 512, 610 may be concurrently implemented (e.g., such that altered filtered provider objects are provided to the client device 104).

However, the method 600 may be used to alter provider objects (e.g., and implemented up to the block 608) before filtering the provider objects using the method 500, and the blocks 512, 610 may be concurrently implemented (e.g., such that altered filtered provider objects are provided to the client device 104).

In examples where the method 500 and the method 600 are implemented concurrently, the blocks 502, 602, and the blocks 504, 604 may be implemented concurrently.

Hereafter, for clarity, the method 500 and the method 600 will be described independent of one another. For example, the method 500 will be described with respect to FIG. 7, FIG. 8, FIG. 9, FIG. 10, FIG. 11, FIG. 12, FIG. 13, FIG. 14, and FIG. 15, and the method 500 will be described with respect to FIG. 16, FIG. 17 and FIG. 18.

Figure 19:
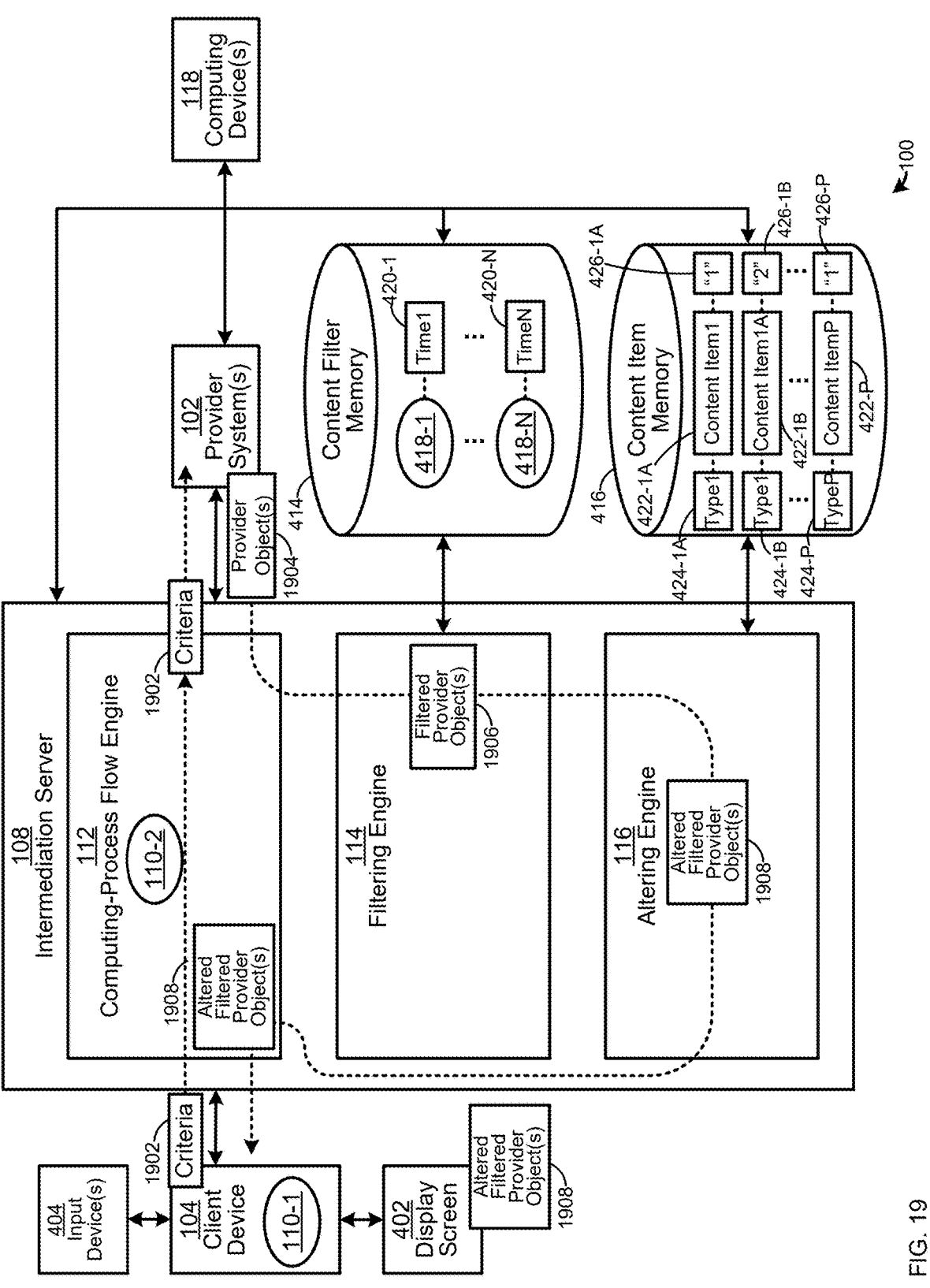
FIG. 19 depicts the system as depicted in FIG. 4 implementing a method for filtering and altering provider objects from one or more provider systems, according to non-limiting examples.

However, the method 500, 600 being implemented concurrently is described with respect to FIG. 19.

Furthermore, in FIG. 7, FIG. 8, FIG. 9, FIG. 10, FIG. 11, FIG. 12, FIG. 13, FIG. 14, FIG. 15, FIG. 16, FIG. 17, FIG. 18 and FIG. 19, flow of data between components of the system 100 will be indicated via arrows having dashed lines.

Figure 7:
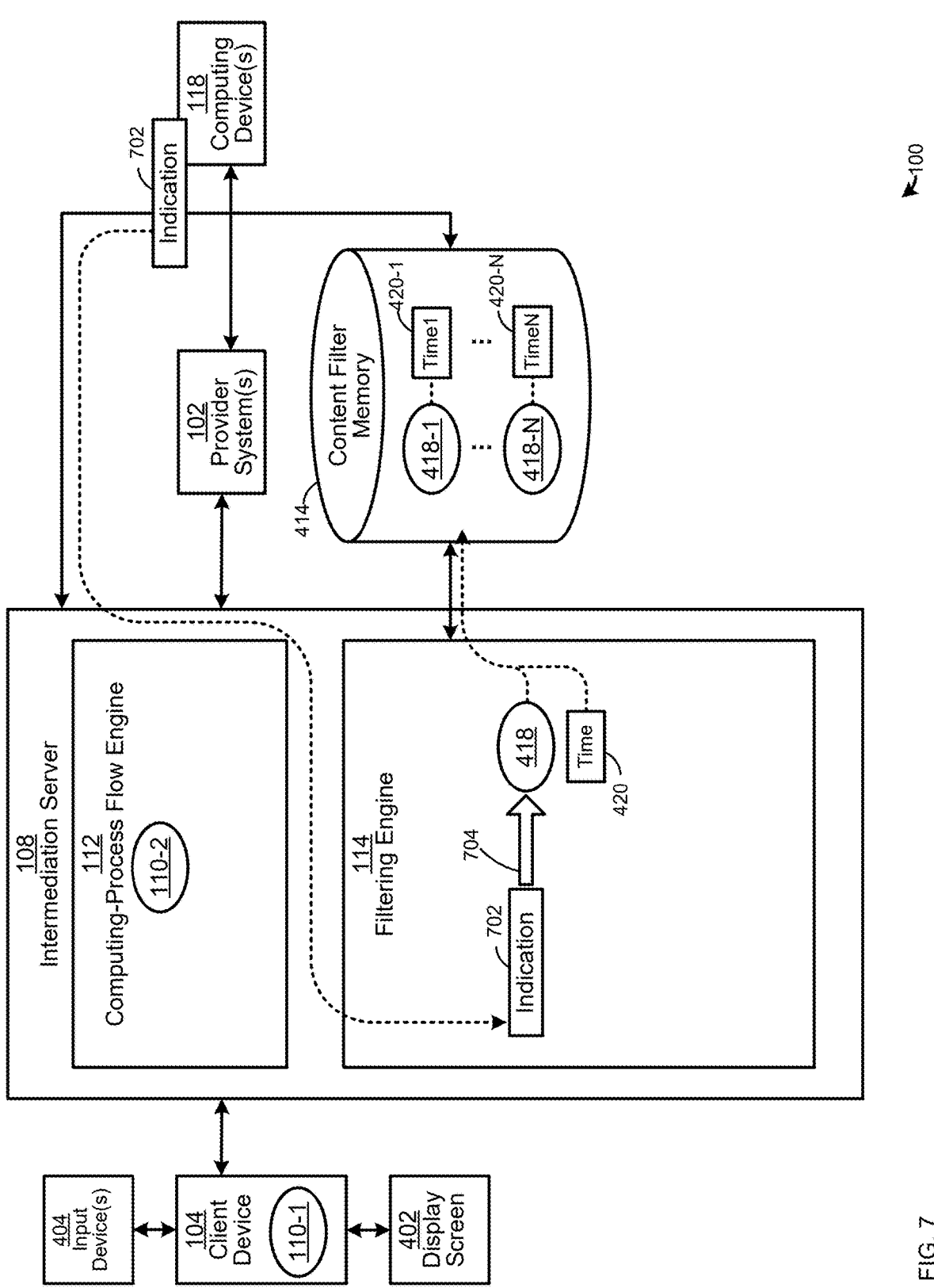
FIG. 7 depicts the system as depicted in FIG. 4 implementing aspects of a method for filtering provider objects from one or more provider systems, according to non-limiting examples.

Attention is first directed to FIG. 7, which depicts the system 100 of FIG. 4, but without the altering engine 116, the content item memory 416 and the content items 422 (e.g., as well as without the types 424 and the priorities 426), though they may nonetheless be present.

At FIG. 7, a computing device 118 is transmitting (and/or providing), to the intermediation server 108 an indication 702 of a computer-code content filter 418 (e.g., generated via a GUI as described herein that enables conditions for computer-code content filters 418 to be populated). The intermediation server 108 receives the indication 702 and the filtering engine 114 generates (e.g., as indicated by an arrow 704), from the indication 702, a computer-code content filter 418 and a respective timestamp 420 (e.g., indicating a "Time") which are stored at the content filter memory 414 in association with each other.

Alternatively, the computing device 118 may generate the computer-code content filter 418 and populate the content filter memory 414 with the computer-code content filter 418. In these examples, the timestamp 420 may be generated by the computing device 118 and/or the intermediation server 108.

Figure 8:
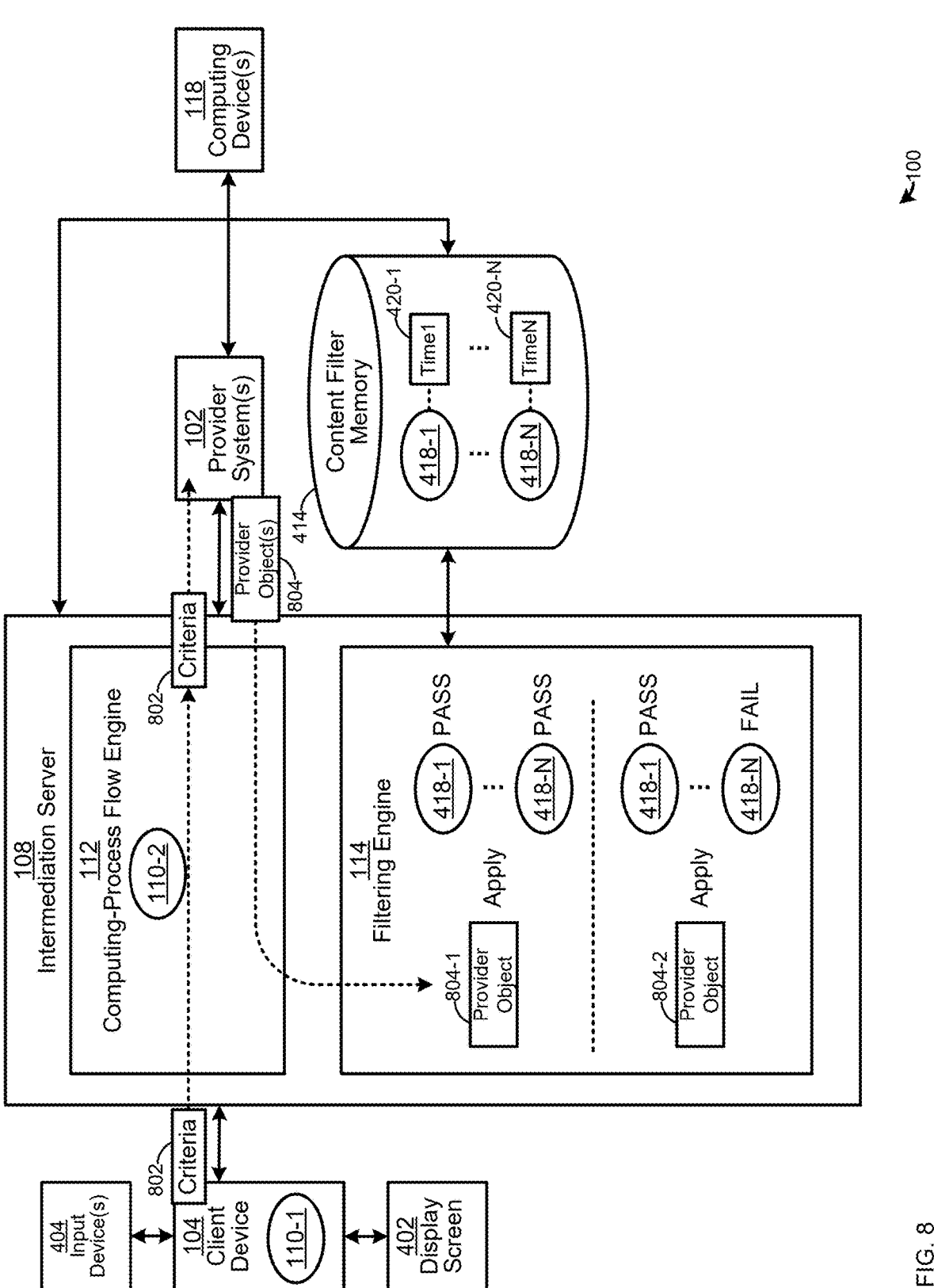
FIG. 8 depicts the system as depicted in FIG. 4 implementing further aspects of a method for filtering provider objects from one or more provider systems, according to non-limiting examples.

Attention is next directed to FIG. 8, which is understood to follow from FIG. 7. FIG. 8 depicts the intermediation server 108 implementing (e.g., at the block 502 of the method 500), the computing-process flow 110 (e.g., via the computing-process flow engine 112) and receiving (e.g., at the block 504 of the method 500), from the client device 104, search criteria 802, which are provided to the provider systems 102 to perform a search. While not depicted, the intermediation server may convert the search criteria 802 to one or more formats associated with provider systems 102 before providing the search criteria 802 to the provider systems 102.

While not depicted, the search criteria 802 may be used to search a cache of provider object maintained by the intermediation server 108 (e.g., the cache comprising previous provider objects returned by one or more of the provider systems 102 in earlier searches).

As depicted, one or more of the provider systems 102 return provider objects 804 that meet the search criteria 802 (and/or, optionally, one or more of the provider objects 804 may be returned from the aforementioned cache), such that the intermediation server 108 receives (e.g., at the block 506 of the method 500) the provider objects 804, for example at the computing-process flow engine 112. However, rather than provide the provider objects 804 to the client device 104, the provider objects 804 are provided to the filtering engine 114 which applies (e.g., at the block 508 of the method 500) the computer-code content filters 418 to the provider objects 804.

In the depicted example, the provider objects 804 may comprise at least a first provider object 804-1 and a second provider object 804-2, though the provider objects 804 may comprise any suitable number of provider objects.

As also depicted in FIG. 8, the computer-code content filters 418 may be retrieved from the content filter memory 414 and applied to the first provider object 804-1 and the second provider object 804-2. For clarity, FIG. 8 depicts such applications divided by a dashed line.

As depicted, the first provider object 804-1 passes all the computer-code content filters 418 (e.g., indicated via "PASS"), but the second provider object 804-2 fails at least the computer-code content filter 418-N (e.g., indicated by "FAIL").

Figure 9:
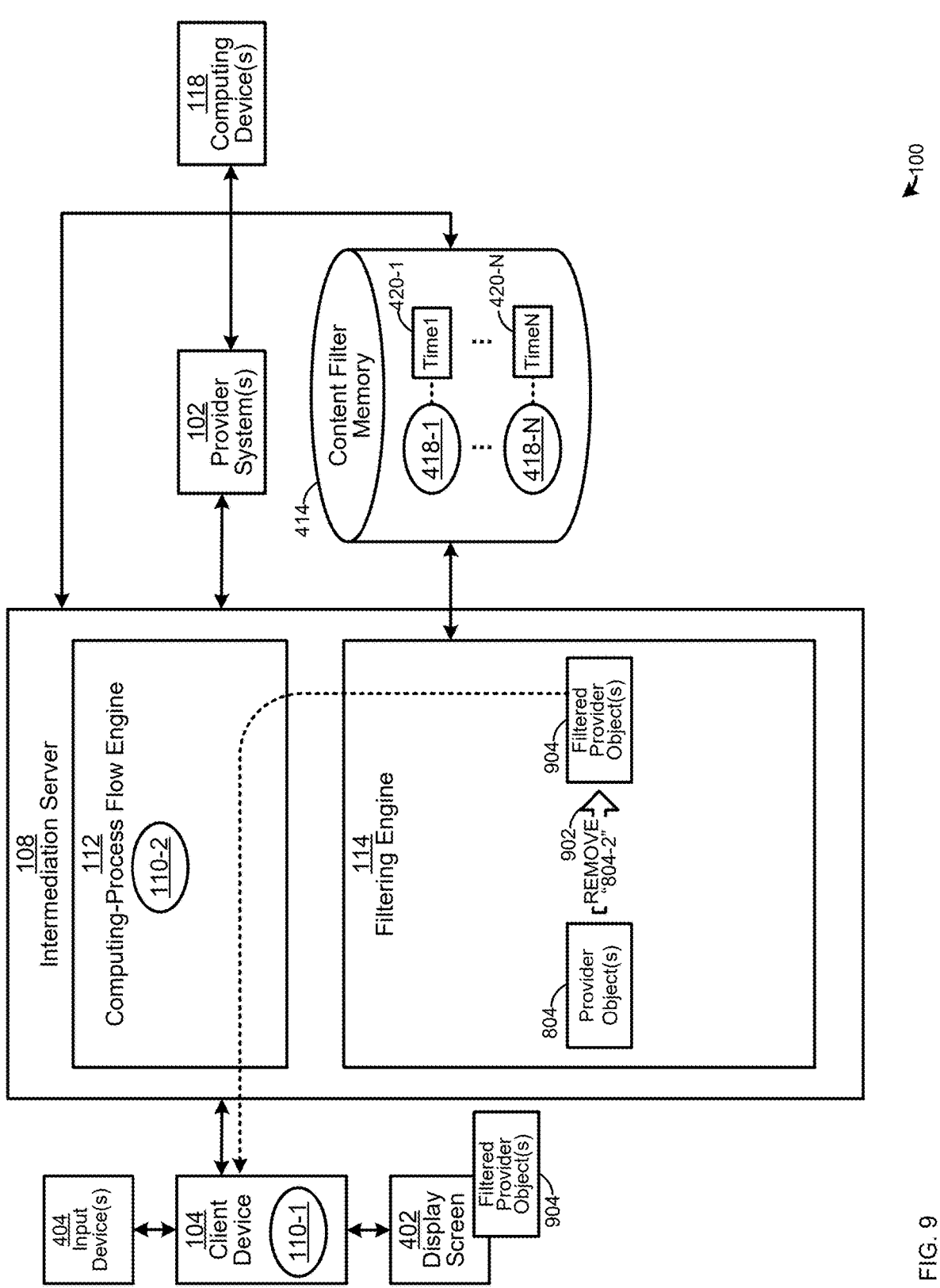
FIG. 9 depicts the system as depicted in FIG. 4 implementing further aspects of a method for filtering provider objects from one or more provider systems, according to non-limiting examples.

Turning to FIG. 9, which is understood to follow from FIG. 8, as the second provider object 804-2 failed to pass all the computer-code content filters 418, the second provider object 804-2 is removed (e.g., at the block 510 of the method 500) from the provider objects 804 (e.g., as indicated by an arrow 902) to generate filtered provider objects 904.

The filtered provider objects 904 are provided (e.g., at block 512 of the method 500) to the client device 104, and the filtered provider objects 904 may be provided at the display screen 404 of the client device 104. In particular, the filtered provider objects 904 are provided from the filtering engine 114 to the computing-process flow engine 112, and the computing-process flow engine 112 provides the filtered provider objects 904 to the client device 104, for example during implementation of the computing-process flow 110. Indeed, put another way, the intermediation server 108 may control the display screen 404 of the client device 104 to provide the filtered provider objects 904.

In this manner, one or more of the computing devices 118 may cause the provider objects 804 to be altered to the filtered provider objects 904 without needing to change the computing-process flow 110, other than to briefly interrupt the computing-process flow 110 to generate the filtered provider objects 904. Such interruption may be performed by the intermediation server 108 implementing the application 206. Nonetheless, the steps 302 of the computing-process flow 110 are understood to be implemented.

Attention is next directed to FIG. 10, which again depicts the search criteria 802, and the provider objects 804 as described with respect to FIG. 8. However, in this example, it is understood that the provider objects 804 include a given provider object 804-X that comprises includes a first provider object 804-X1 (e.g., a first component of the given provider object 804-X representing, for example, a flight) and a second provider object 804-X2 (e.g., a second component of the given provider object 804-X representing, for example, a glass of luxury alcohol). It is understood in this example that the second provider object 804-X2 may be dependent on the first provider object 804-X1.

Similar to as in FIG. 8, the computer-code content filters 418 may be retrieved from the content filter memory 414 and applied to the first provider object 804-X1 and the second provider object 804-X2.

As depicted, the first provider object 804-X1 passes all the computer-code content filters 418 (e.g., indicated via "PASS"), but the second provider object 804-2 fails at least the computer-code content filter 418-N (e.g., indicated by "FAIL").

Figure 10:
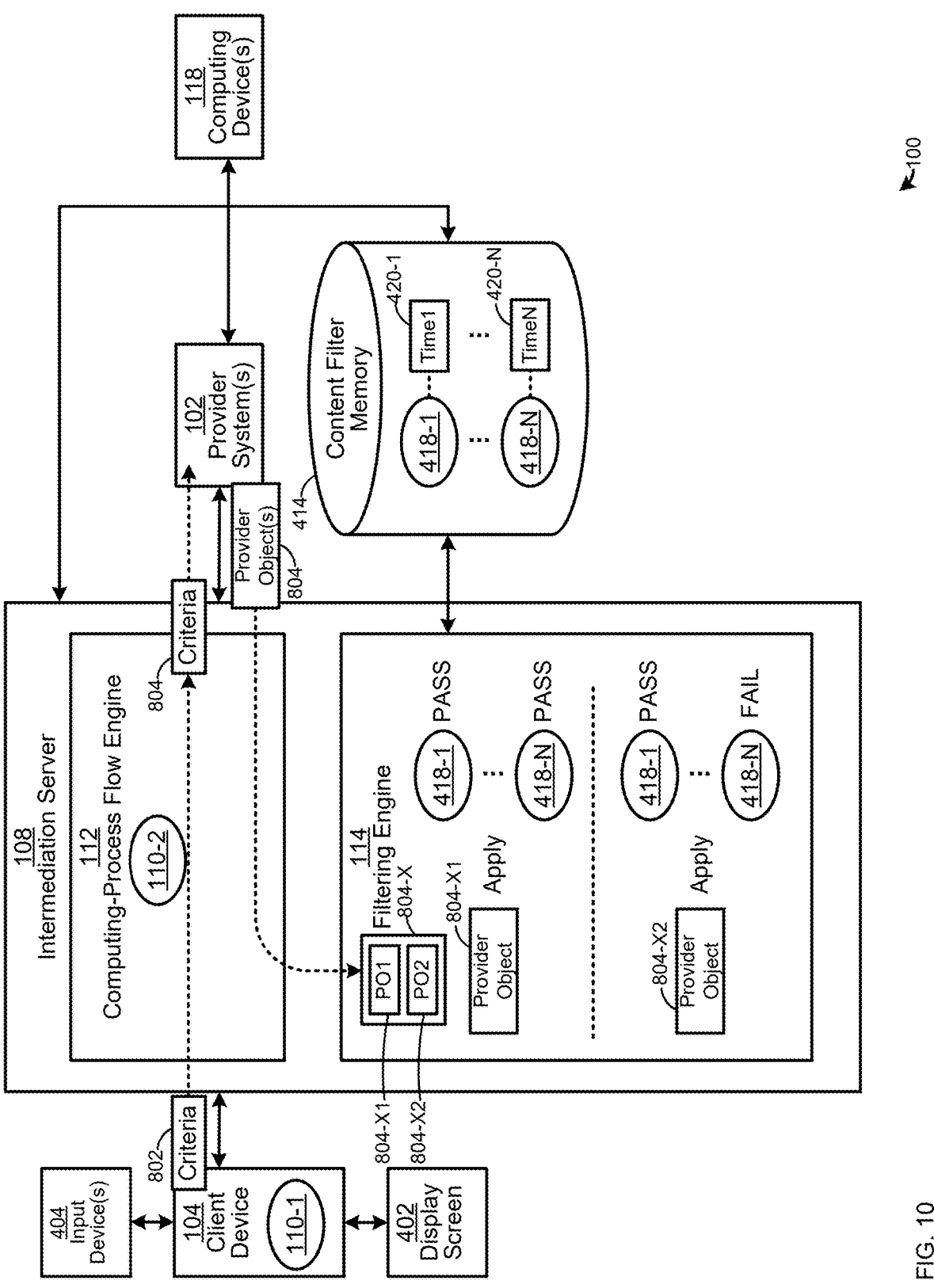
FIG. 10 depicts the system as depicted in FIG. 4 implementing further aspects of a method for filtering provider objects from one or more provider systems, according to non-limiting examples.
Figure 11:
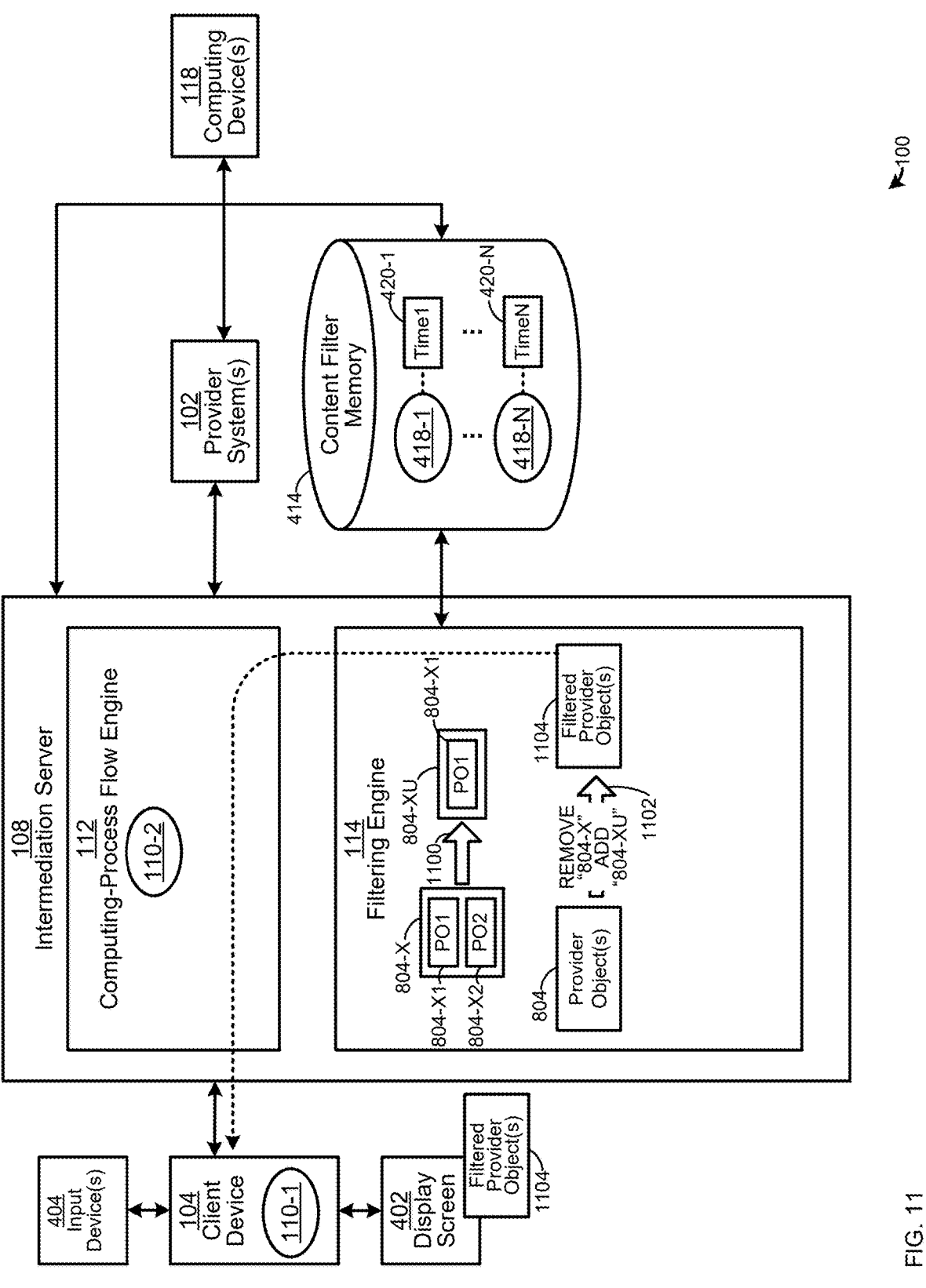
FIG. 11 depicts the system as depicted in FIG. 4 implementing further aspects of a method for filtering provider objects from one or more provider systems, according to non-limiting examples.

Turning to FIG. 11, which is understood to follow from FIG. 10, as the second provider object 804-X2 failed to pass all the computer-code content filters 418, the second provider object 804-X2 is removed from the given provider object 804-X to generate an updated provider object 804-XU

(e.g., as indicated by an arrow 1100), which, as depicted, comprises the first provider object 804-X1.

Furthermore, as the second provider object 804-X2 failed to pass all the computer-code content filters 418, and as the provider object 804-XU was generated, which is understood to include the first provider object 804-X1 that passed all the computer-code content filters 418, the given provider object 804-X is removed from the provider objects 804 and replaced with the updated provider object 804-XU (e.g., as indicated by an arrow 1102) to generate filtered provider objects 1104, which are provided to the client device 104. As in FIG. 9, the filtered provider objects 1104 are provided at the display screen 404 of the client device 104.

Attention is next directed to FIG. 12, which again depicts the search criteria 802, and the provider objects 804 as described with respect to FIG. 8. However, in this example, it is understood that provider objects 804 include a given provider object 804-Y that comprises includes a primary provider object 804-Y1 (e.g., representing, for example, a flight) and a secondary provider object 804-Y2 (e.g., representing, for example, a glass of luxury alcohol). It is understood in this example that the secondary provider object 804-Y2 is dependent on the primary provider object 804-Y1.

Similar to as in FIG. 8, the computer-code content filters 418 may be retrieved from the content filter memory 414 and applied to the first provider object 804-Y1 and the second provider object 804-Y2.

As depicted, the primary provider object 804-Y1 fails at least the computer-code content filter 418-1 (e.g., indicated via "FAIL"), and the secondary provider object 804-2 passes all the computer-code content filters 418 (e.g., indicated by "PASS"). While the secondary provider object 804-Y2 passes all the computer-code content filters 418, the secondary provider object 804-Y2 may not, alone, be provided to the client device 104.

Figure 12:
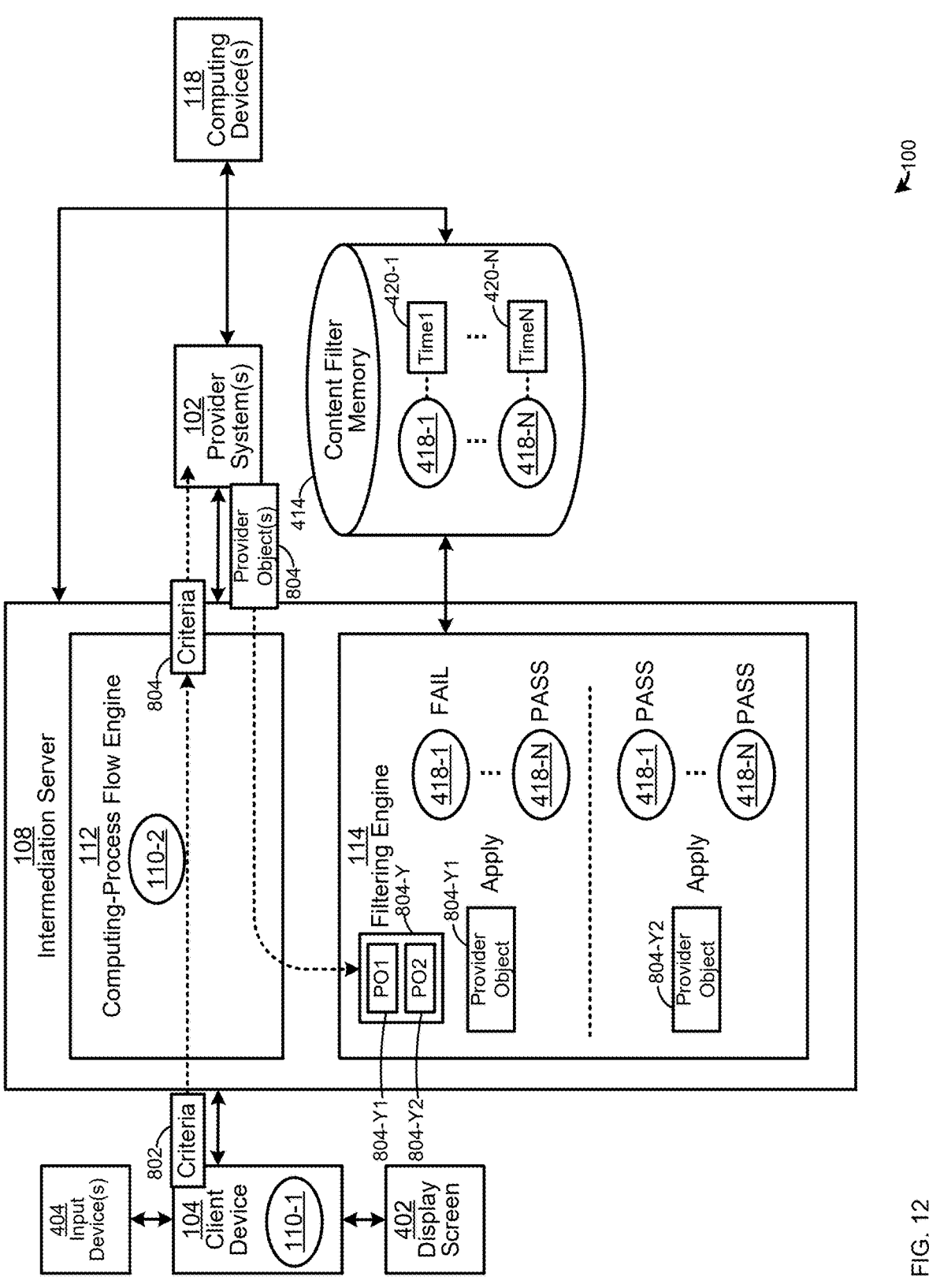
FIG. 12 depicts the system as depicted in FIG. 4 implementing further aspects of a method for filtering provider objects from one or more provider systems, according to non-limiting examples.
Figure 13:
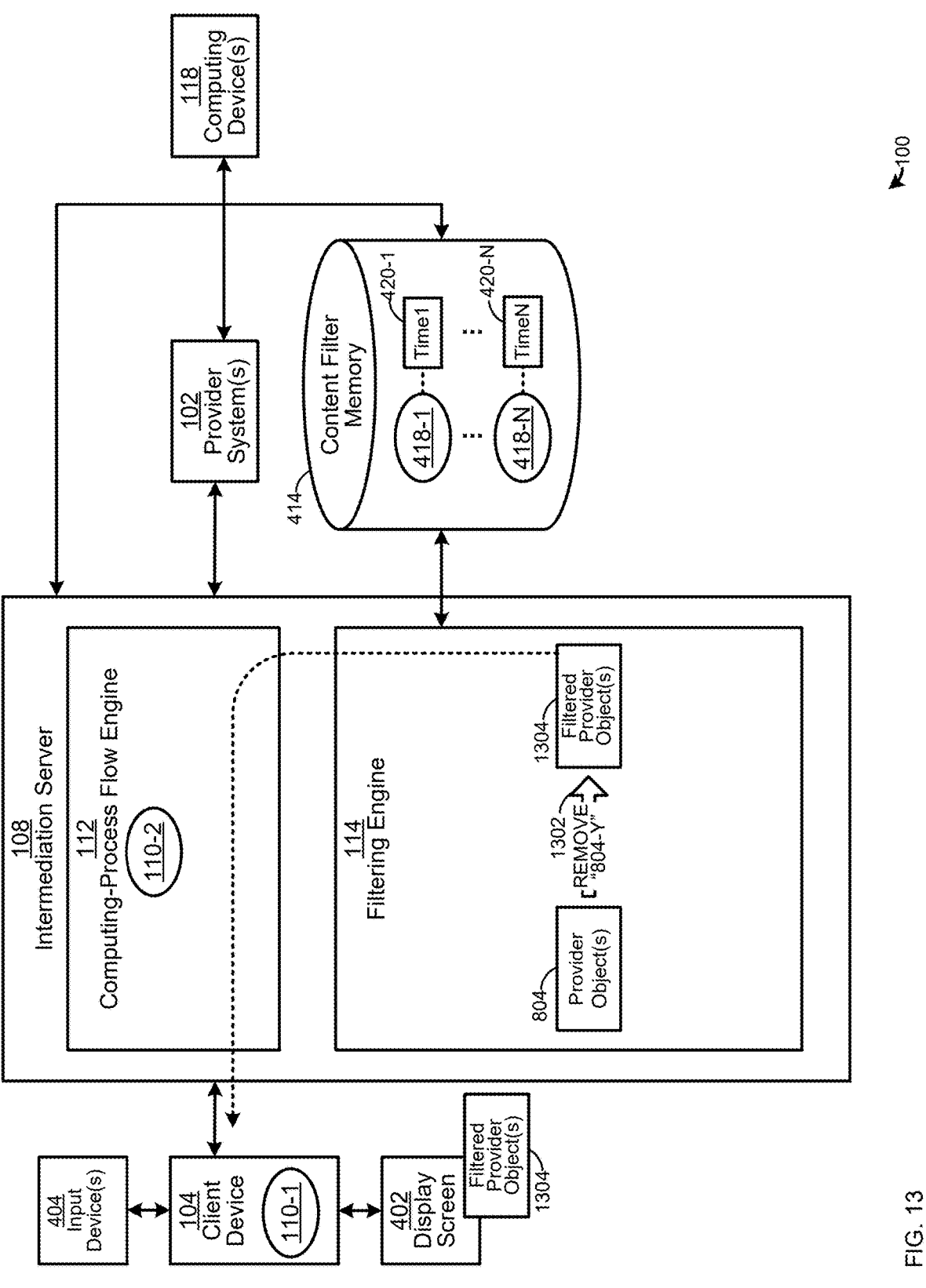
FIG. 13 depicts the system as depicted in FIG. 4 implementing further aspects of a method for filtering provider objects from one or more provider systems, according to non-limiting examples.

As such, turning to FIG. 13, which is understood to follow from FIG. 12, as the primary provider object 804-Y1 failed at least one computer-code content filter 418, the given provider object 804-Y is removed from the provider objects 804 (e.g., as indicated by an arrow 1302) to generate filtered provider objects 1304, which are provided to the client device 104. As in FIG. 9, the filtered provider objects 1304 are provided at the display screen 404 of the client device 104.

While the examples of FIG. 7 to FIG. 9, FIG. 10 to FIG. 11, and FIG. 12 to FIG. 13 are depicted as being separate from one other, they may be implemented concurrently for the provider objects 804 such that a final set of filtered provider objects comprises the provider objects 804 with the provider objects 804-2, 804-X, 804-Y removed and the updated provider object 804-XU added.

Figure 14:
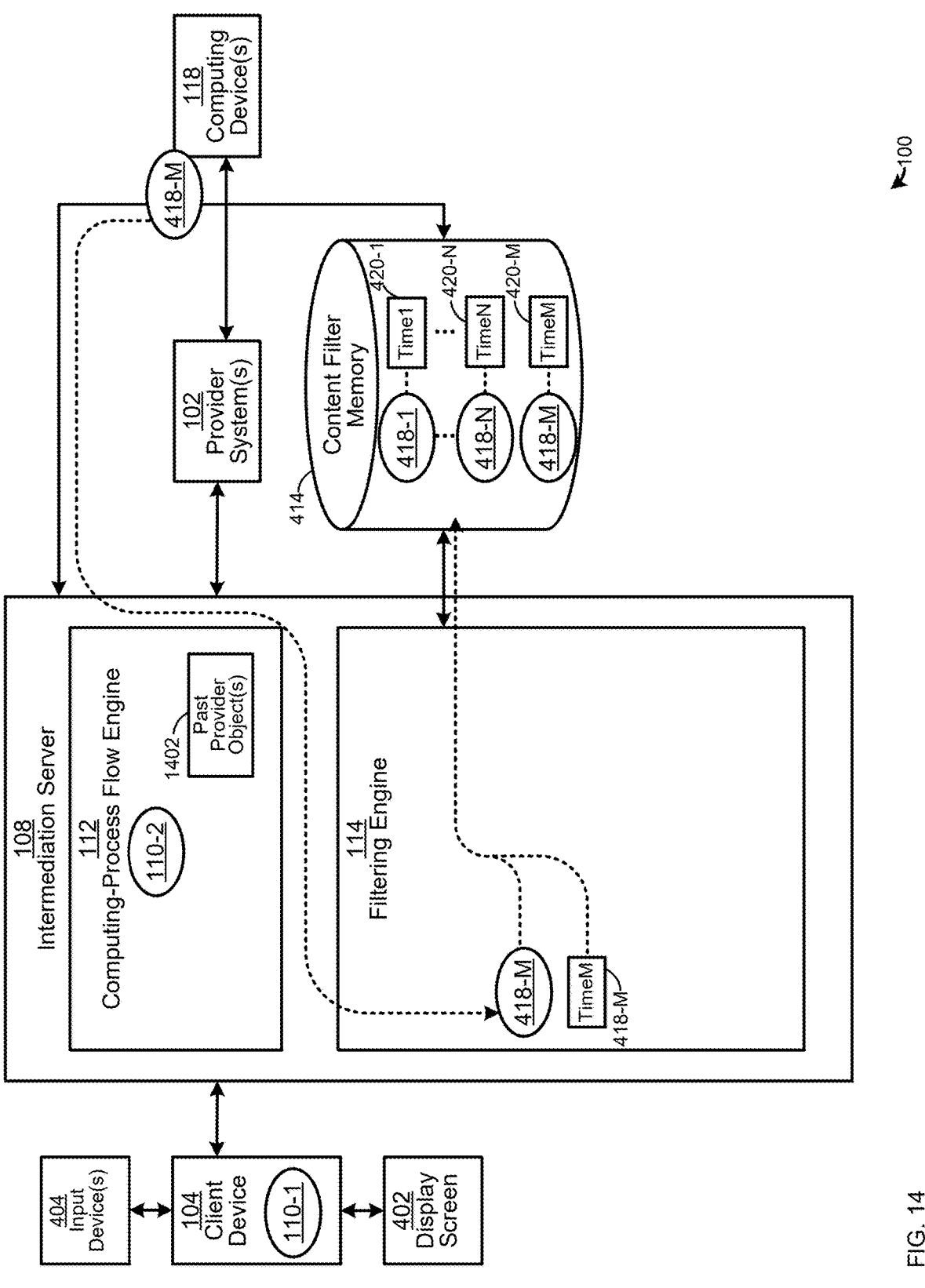
FIG. 14 depicts the system as depicted in FIG. 4 implementing further aspects of a method for filtering provider objects from one or more provider systems, according to non-limiting examples.

Attention is next directed to FIG. 14 which depicts the computing-process flow engine 112 maintaining a set of past provider objects 1402, for example purchased at the pay step 302-4, and which were previously provided to one or more client devices 104.

While not depicted, the past provider objects 1402 may be maintained at a memory and/or cache (e.g., such as at the memory 204, and the like and/or at a memory and/or cache internal and/or external to the intermediation server 108).

It is understood that the past provider objects 1402 previously passed all the computer-code content filters 418-1 to 418-N, for example when the method 500 was previously implemented. While also not depicted, the past provider objects 1402 may be stored with respective times that the past provider objects 1402 previously passed all the computer-code content filters 418-1 to 418-N, and the like.

As also depicted in FIG. 14, the intermediation server 108 receives a new computer-code content filter 418-M from a computing device 118, which may be received via an indication similar to the indication 702, and generated accordingly, or, as depicted, the computing device 118 may generate the new computer-code content filter 418-M. Regardless, the new computer-code content filter 418-M is added to the computer-code content filters 418 (e.g., at the content filter memory 414) with a respective timestamp 418-M.

Figure 15:
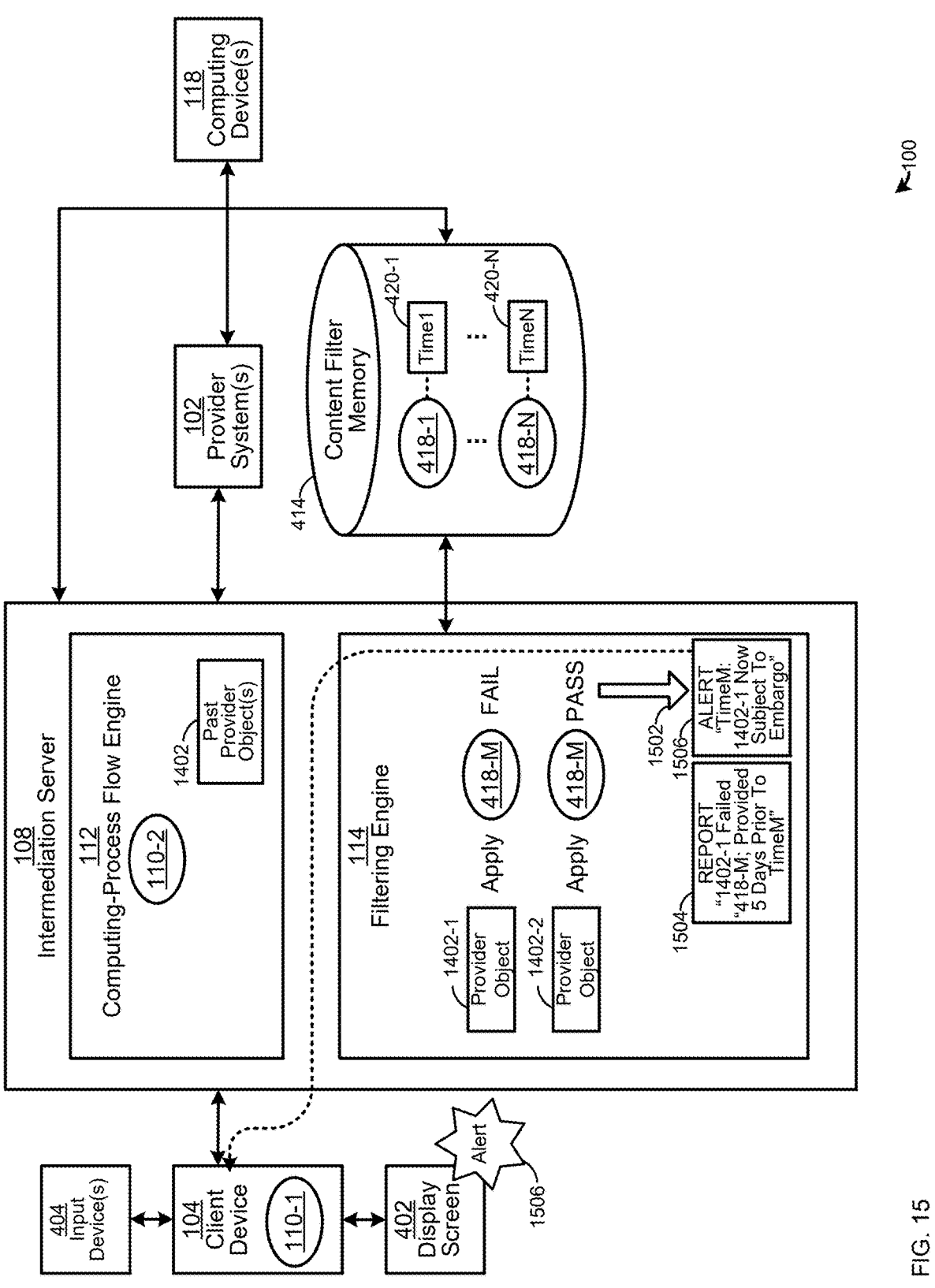
FIG. 15 depicts the system as depicted in FIG. 4 implementing further aspects of a method for filtering provider objects from one or more provider systems, according to non-limiting examples.

Turning now to FIG. 15, which follows from FIG. 14, the filtering engine 114 (e.g., and/or intermediation server 108) applies the new computer-code content filter 418-M to the past provider objects 1402. For example, the filtering engine 114 (e.g., and/or intermediation server 108) may compare respective times that the past provider objects 1402 previously passed all the computer-code content filters 418-1 to 418-N with the timestamps 420 (e.g., including, but not limited to, the timestamp 420-M) and determine that the timestamp 420-M is later than respective times that the past provider objects 1402 previously passed all the computer-code content filters 418-1 to 418-N. As such, the filtering engine 114 applies the new computer-code content filter 418-M to the past provider objects 1402. It is understood in these examples, that any service, such as a flight, represented by the past provider objects 1402 may not yet have occurred.

In particular, as depicted, it is understood that the past provider objects 1402 include at least a first past provider object 1402-1 that fails the new computer-code content filter 418-M and a second past provider object 1402-2 that passed the new computer-code content filter 418-M. For example, the new computer-code content filter 418-M may indicate that a new embargo has been placed on an origin or destination of a flight associated with the first past provider object 1402-1.

As the first past provider object 1402-1 fails the new computer-code content filter 418-M, the filtering engine 114 may generate (e.g., as indicated by an arrow 1502) a report 1504 and/or an alert 1506.

As depicted, the report 1504 may be indicative of when the first past provider object 1402-1 was provided to the client device 104 relative to the respective timestamp 420-M (e.g., or all the timestamps 420). For example, as depicted, the report 1504 indicates that the first past provider object 1402-1 failed the new computer-code content filter 418-M but was provided "5 Days" prior to the "TimeM". Indeed, the report 1504 may be indicative of when all the past provider objects 1402 were provided to a respective client device 104 relative to the respective timestamps 420. Indeed, a report, similar to the report 1504, may be generated at any suitable time, for example as part of an audit process (e.g., before or after the new computer-code content filter 418-M is added to the computer-code content filters 418).

As depicted, the alert 1506 may be indicative of conditions of the new computer-code content filter 418-M that were not passed by the past provider object 1402-1 and a time "TimeM" of the timestamp 420-M. For example, as depicted, the alert 1506 includes text "TimeM: 1402-1 Now Subject Of Embargo". As depicted, the alert 1506 is provided to the client device 104 (e.g., presuming that the client device 104 purchased the past provider object 1402-1), which provides the alert 1506 at the display screen 404. A user of the client device 104 (e.g., a traveler), may then take remedial action, for example to change a flight of the past provider object 1402-1, and the like (e.g., to comply with the embargo).

Figure 16:
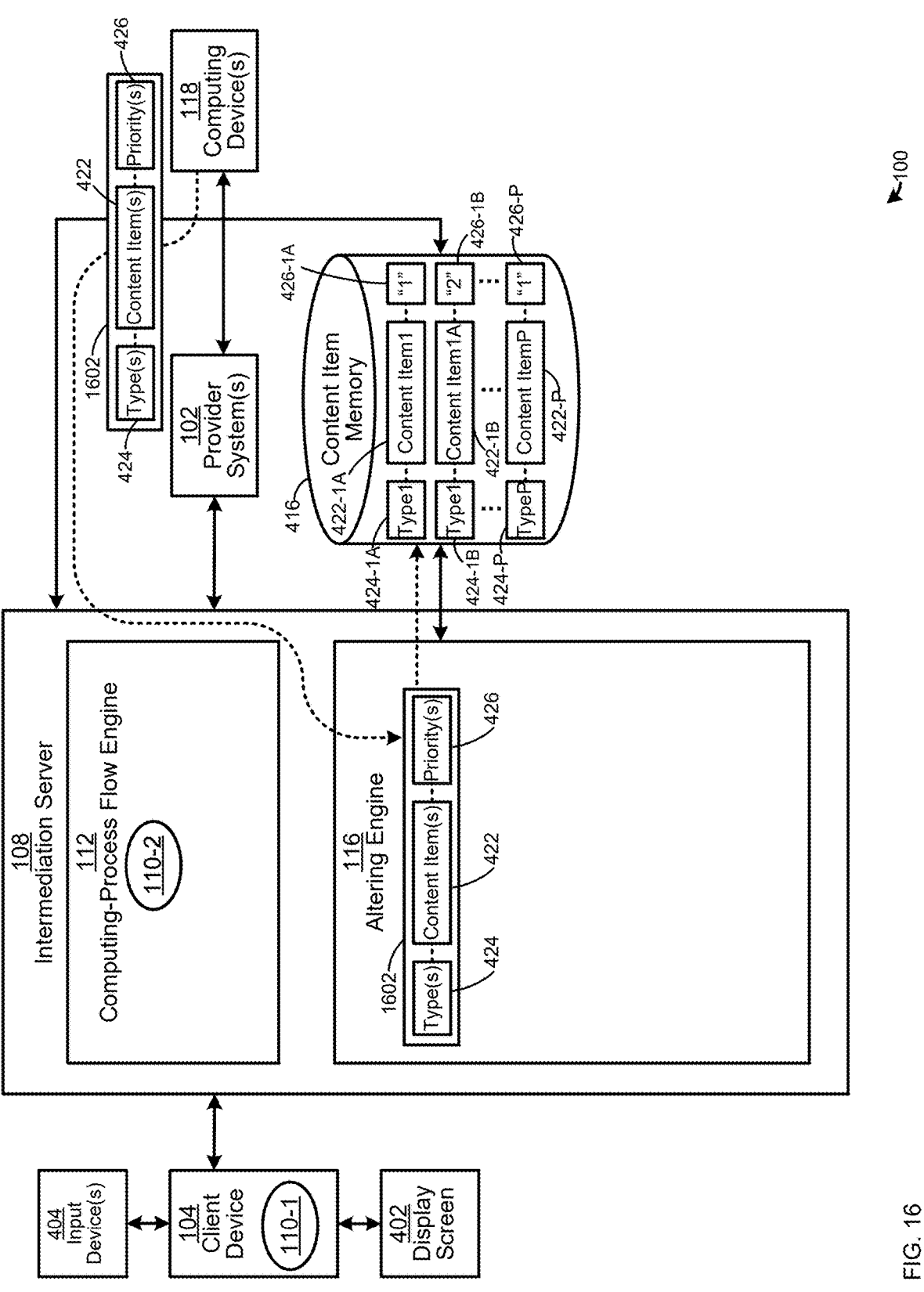
FIG. 16 depicts the system as depicted in FIG. 4 implementing aspects of a method for altering provider objects from one or more provider systems, according to non-limiting examples.
Figure 17:
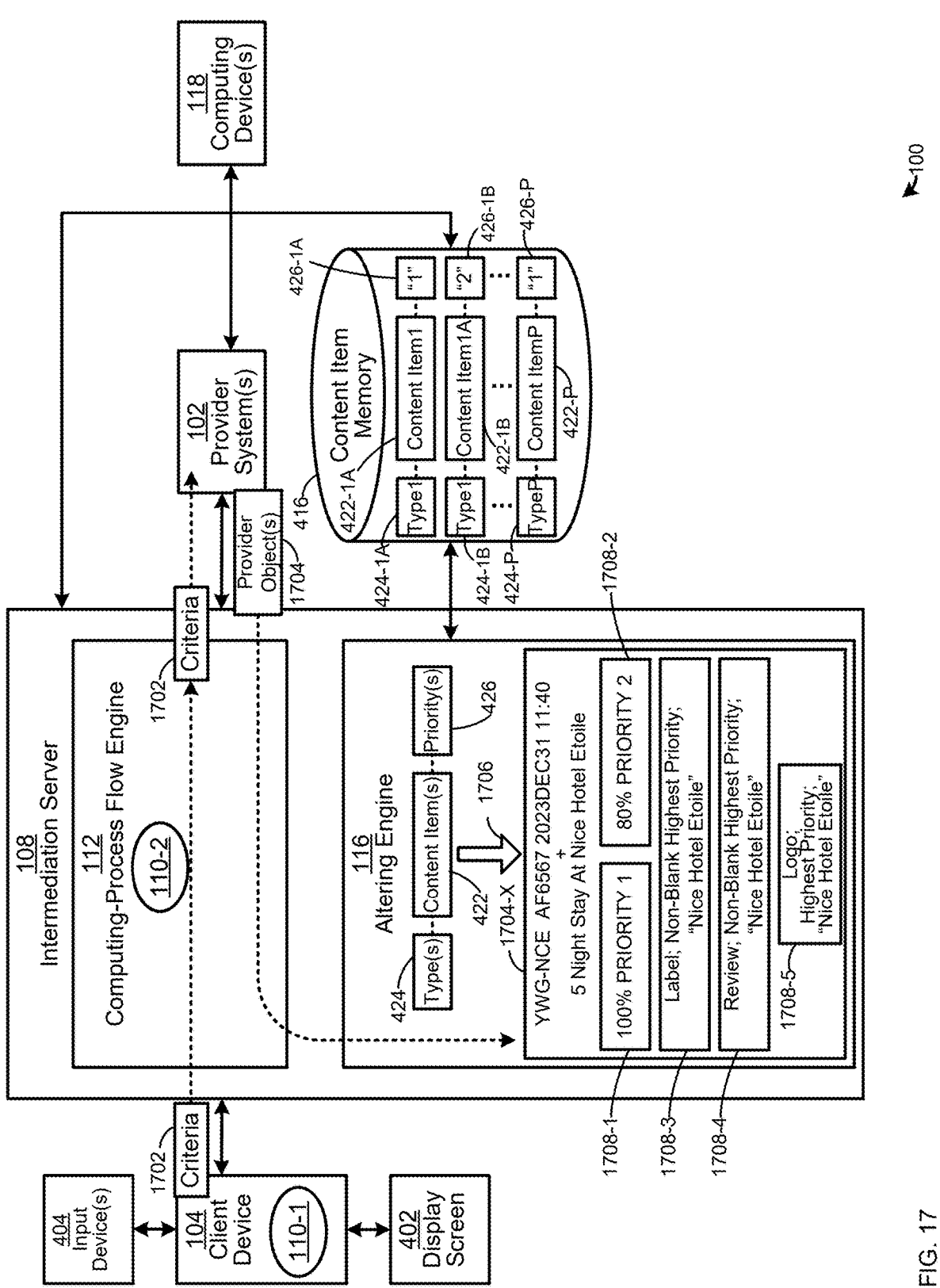
FIG. 17 depicts the system as depicted in FIG. 4 implementing further aspects of a method for altering provider objects from one or more provider systems, according to non-limiting examples.
Figure 18:
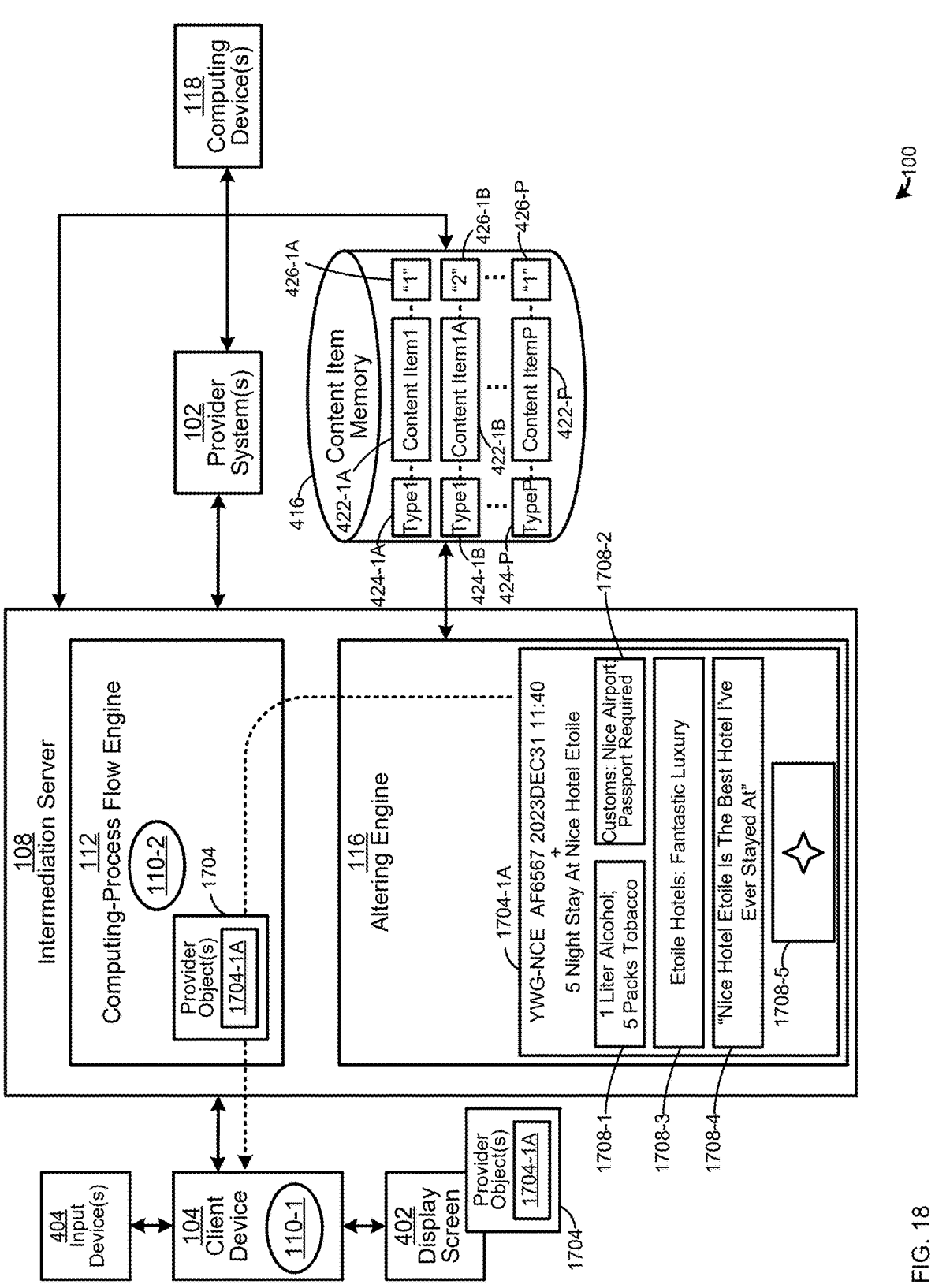
FIG. 18 depicts the system as depicted in FIG. 4 implementing further aspects of a method for altering provider objects from one or more provider systems, according to non-limiting examples.

Attention is next directed to FIG. 16, FIG. 17 and FIG. 18 which depict aspects of the method 600.

Attention is first directed to FIG. 16, which depicts the system 100 of FIG. 4, but without the filtering engine 114, the content filter memory 414 and the computer-code content filters 418 (e.g., as well as without the timestamps 420, though they may nonetheless be present).

At FIG. 16, one or more computing devices 118 are transmitting (and/or providing), to the intermediation server 108, data 1602 comprising one or more content items 422, with respective one or more types 424 and respective one or more priorities 426. The intermediation server 108 receives the data 1602 and the altering engine 116 and populates the content item memory 416 with the one or more content items 422, the respective one or more types 424 and respective one or more priorities 426 of the data 1602.

Attention is next directed to FIG. 17, which is understood to follow from FIG. 16, FIG. 17 depicts the intermediation server 108 implementing (e.g., at the block 602 of the method 600), the computing-process flow 110 (e.g., via the computing-process flow engine 112) and receiving (e.g., at the block 604 of the method 600), from the client device 104, search criteria 1702, which are provided to the provider systems 102 to perform a search. While not depicted, the intermediation server may convert the search criteria 1702 to one or more formats associated with provider systems 102 before providing the search criteria 1702 to the provider systems 102.

While not depicted, the search criteria 1702 may be used to search a cache of provider object maintained by the intermediation server 108 (e.g., the cache comprising previous provider objects returned by one or more of the provider systems 102 in earlier searches).

As depicted, one or more of the provider systems 102 return provider objects 1704 that meet the search criteria 1702 (and/or, optionally, one or more of the provider objects 1704 may be returned from the aforementioned cache), such that the intermediation server 108 receives (e.g., at the block 606 of the method 600) the provider objects 1704, for example at the computing-process flow engine 112. However, rather than provide the provider objects 1704 to the client device 104, the computing-process flow 110 is paused, and the provider objects 1704 are provided to the altering engine 116, which accesses and/or retrieves the content items 422 at the content filter memory 414, as well as the types 424 and the priorities 426, and populates (e.g., at the block 608 of the method 600) fields of the provider objects 1704 as is next described.

In the depicted example, the provider objects 1704 may comprise at least a given provider object 1704-X, though the provider objects 1704 may comprise any suitable number of provider objects. Indeed, it is understood that the given provider object 1704-X is provided merely as an example, and that population of fields of the given provider object 1704-X as next described may occur with all of the provider objects 1704, or any suitable subset thereof.

As depicted, the given provider object 1704-X represents a flight (e.g., from an origin airport "YWG" to a destination airport "NCE" on Dec. 31, 2023 at 11:40 (e.g., 11:40 am), and having a flight code "AF6567"). However, the given provider object 1704-X further represents a five night hotel stay (e.g., as indicated by text "5 Night Stay At Nice Hotel Etoile"). For example, the given provider object 1704-X may comprise a first provider object representing the flight, offered by an entity operated by a provider system 102, and a second provider object representing the hotel stay, offered by an entity operated by a computing device 118 (e.g., which may be identified by an identifier "Nice Hotel Etoile").

As depicted, the given provider object 1704-X comprises a plurality of fields 1708-1, 1708-2, 1708-3, 1708-4, 1708-5 (e.g., the fields 1708 and/or a field 1708) associated with respective content item types, for example as indicated by metadata of the fields 1708 (and/or in any other suitable manner). Such metadata is depicted at the fields 1708, and is next described.

For example, the field 1708-1 is associated with content items 422 having a priority 426 of "1", the field 1708-2 is associated with content items 422 having a priority 426 of "2", the field 1708-3 is associated with content items 422 having a "Label" content type 424 of a highest priority 426 (e.g., amongst content items 422 having a "Label" content type 424), the field 1708-4 is associated with content items 422 having a "Review" content type 424 of a highest priority 426 (e.g., amongst content items 422 having a "Review" content type 424), and the field 1708-5 is associated with content items 422 having a "Logo" content type 424 of a highest priority 426 (e.g., amongst content items 422 having a "Logo" content type 424).

Furthermore, fields 1708-3, 1708-4, 1708-5 include an identifier "Nice Hotel Etoile" identifying the entity offering the hotel stay represented by the given provider object 1704-X. Such an identifier, in combination with types identified in the fields 1708-3, 1708-4, 1708-5, enable the altering engine 116 and/or the intermediation server 108 to identify content items 422 of a similar and/or same type 424 to populate the fields 1708-3, 1708-4, 1708-5.

Using the field 1708-3 as an example, the altering engine 116 and/or the intermediation server 108 may search for a content item 422 of a type 424 "Label" and "Nice Hotel Etoile", and of a highest priority 426 (e.g., for instances where there is more than one content item 422 of a type 424 "Label" and "Nice Hotel Etoile", but of different priorities) to populate the field 1708-3.

Similarly, for the field 1708-4, the altering engine 116 and/or the intermediation server 108 may search for a content item 422 of a type 424 "Review" and "Nice Hotel Etoile", and of a highest priority 426 (e.g., for instances where there is more than one content item 422 of a type 424 "Review" and "Nice Hotel Etoile", but of different priorities) to populate the field 1708-4.

Similarly, for the field 1708-5, the altering engine 116 and/or the intermediation server 108 may search for a content item 422 of a type 424 "Logo" and "Nice Hotel Etoile", and of a highest priority 426 (e.g., for instances where there is more than one content item 422 of a type 424 "Logo" and "Nice Hotel Etoile", but of different priorities) to populate the field 1708-5.

In instances where there is more than one content item 422 of a given type 424 and given priority 426 that match a type of a field 1708, the altering engine 116 and/or the intermediation server 108 may use any suitable process to select a content item 422 including, but not limited to, a first content item 422 found, a content item 422 that was most recently added to the content items 422 (e.g., presuming the content items 422 are timestamped), and the like.

While the fields 1708-1, 1708-2 do not include such identifiers corresponding to the types 424, it is understood that the priorities of "1" and "2" enable the altering engine 116 and/or the intermediation server 108 to identify content items 422 of a similar and/or same priority type to populate the fields 1708-1, 1708-2.

Furthermore the fields 1708-1, 1708-2 include respective associated distributions of "100%" and "80%". Hence, for the field 1708-1, 100% of content items 422 associated with a priority of "1" are used to populate the field 1708-1.

Similarly, for the field 1708-2, 80% of content items 422 associated with a priority of "2" are used to populate the field 1708-2. In the event that a given number of content items 422 associated with a priority of "2" result in "80%" of such content items 422 being a fractional number (e.g., 80% of two content items 422 associated with a priority of "2" would be 1.6 content items 422), the altering engine 116 and/or the intermediation server 108 may round such a fractional number to an integer (e.g., from 1.6 to 2) to include an integer number of such content items 422.

Hence, in general, types and/or priorities associated with the fields 1708 may be matched to suitable combinations of the types 424 and the priorities 426 to identify respective content items 422 with which to populate the fields 1708.

It is further understood that population of content items 422 of certain types 424 and/or certain priorities 426 may be dedicated and/or restricted to certain entity types. For example, population of content items 422 of a priority 426 of "1" may be restricted to certain regulator entities (e.g., such as a regulator entity that regulates imports of alcohol, tobacco, and the like). Similarly, population of content items 422 of a priority 426 of "2" may be restricted to government entities (e.g., such as a government entity that issues notices regarding entry procedures and/or requirements, and the like). Similarly, population of content items 422 of a priorities 426 lower than "1" and "2" may be dedicated to entities providing provider objects (e.g., such as an entity providing a flight, a hotel stay, good and/or services, and the like).

Indeed, a priority structure of content items 422 may further allow for certain content items 422 overriding other content items 422. For example, two content items 422 of a "Label" type 424 may be provided for the "Nice Hotel Etoile", a first content item 422 provided by the entity associated with the "Nice Hotel Etoile" and a second content item 422 provided by the entity offering the flight of the given provider object 1704-X. However as the first content item 422 provided by the entity associated with the "Nice Hotel Etoile", the first content item 422 may be assigned a higher priority 426 (e.g., such as "3") than the second content item 422, which may be assigned a lower priority 426 (e.g., such as "4"). Put another way, two entities may have an agreement to combine provider objects (e.g., flights and hotels), and both entities may provide respective content items 422 for fields of provider objects; however, an entity that offers a given provider object of the combined provider objects may have their content items 422 assigned a higher priority 426 than content items 422 provided by another entity. Hence, for example, the entity offering the flight of the given provider object 1704-X may provide content items 422 for the "Nice Hotel Etoile", but such content items 422 would be assigned a lower priority 426 than content items 422 for the "Nice Hotel Etoile" provided by the entity offering the stay at the "Nice Hotel Etoile". Permission to use certain priorities 426 for certain content items 422 may be assigned to an entity when such an entity is given permission (e.g., by the entity operating the intermediation server 108) to populate content items 422 at the content item memory 416, and the like, and/or content items 422 may be assigned a priority 426 by the altering engine 116 and/or the intermediation server 108 when content items 422 are received (e.g., as depicted in FIG. 16), for example based on a type 424 of content item 422 received and a source of the content item 422.

Attention is next directed to FIG. 18, which depicts the fields 1708 of the given provider object 1704-X as populated by the content items 422, to generate an altered given provider object 1704-A.

For example, the field 1708-1 is populated by 100% of content items 422 of priority "1" (e.g., two content items 422), including text "1 Liter Alcohol" and "5 Packs Tobacco", indicating import restrictions on such items provided in content items 422 provided by a regulator entity.

Similarly, the field 1708-2 is populated by 80% of content items 422 of priority "2" (e.g., two content items 422, and hence while 80% of "2" is 1.6, the number of the content items 422 is rounded to two content items 422), including text "Custom: Nice Airport" and "Passport Required", indicating entry procedures and/or requirements when arriving at the Nice Airport.

The field 1708-3 comprises a content item 422 of a "Label" type 424 (e.g., and of a highest priority) of "Etoile Hotels: Fantastic Luxury".

The field 1708-4 comprises a content item 422 of a "Review" type 424 (e.g., and of a highest priority) of "Nice Hotel Etoile Is The Best Hotel I've Ever Stayed At".

The field 1708-5 comprises a content item 422 of a "Logo" type 424 (e.g., and of a highest priority) of an image of a four-pointed star logo associated with the Nice Hotel Etoile.

It is furthermore understood that a field 1708 generally comprises a graphic placeholder for the given provider object 1704-X, and hence content items 422 may be resized to fit into a respective field 1708. When such content items 422 include text, the content items 422 may be resized in any suitable manner, but restricted to a minimum font size, such as 8 pt. For example, when the number of content items 422 of priority 426 "1" is too large to fit into the field 1708-1 at any font size less than 8 pt, a number of the content items 422 may be limited to the largest number that may fit in the field 1708-1 when a font thereof is resized to 8 pts.

While as depicted in FIG. 17 and FIG. 18, none of the fields 1708 are prepopulated with content items when the given provider object 1704-X is received, in other examples one or more of the fields 1708 may be prepopulated with content items (e.g., by the provider system 102 providing the given provider object 1704-X). In these examples, such content items may be removed from a respective field 1708 and populated with content items 422 from the content item memory 422 to generate the altered given provider object 1704-A, as described herein.

Furthermore, while fields 1708 of only one given provider object 1704-X are depicted as being populated by the altering engine 116, any other suitable fields of any other suitable provider objects 1704 may be similarly populated. Once fields of the provider objects 1704 are populated, as depicted, the provider objects 1704 (e.g., including the altered given provider object 1704-A) may be provided to the client device 104, for example by the computing-process flow engine 112 via continued implementation of the computing-process flow 110, and provided at the display screen 404 of the client device 104.

Furthermore, altering of the provider objects 1704 may occur in conjunction with filtering of the provider objects 1704. For example, with attention next directed to FIG. 19, search criteria 1902 may be received from the client device 104 at the computing-process flow engine 112 in conjunction with implementing the computing-process flow 110, and provided to the one or more provider systems 102. The one or more provider systems 102 may return provider objects 1904 to the computing-process flow engine 112.

Implementation of the computing-process flow 110 may be paused (e.g., by the intermediation server 108 implementing the application 206), and the provider objects 1904 may be provided to the filtering engine 114, which filters the provider objects 1904, as described herein, to generate filtered provider objects 1906. The filtered provider objects 1906 are then provided to the altering engine 116 to generate altered filtered provider objects 1908, which are returned to the computing-process flow engine 112, and the computing-process flow 110 is resumed (e.g., and/or unpaused) such that the computing-process flow engine 112 provides the altered filtered provider objects 1908 to the client device 104, in response to the search criteria 1902. The altered filtered provider objects 1908 may be provided at the display screen 404 of the client device 104.

While FIG. 19 depicts a particular example for generating the altered filtered provider objects 1908, in other examples, the altered filtered provider objects 1908 may be generated by the altering engine 116 first generating altered provider objects from the provider objects 1904, and then the filtering engine 114 generating the altered filtered provider objects 1908 from the altered provider objects generated by the altering engine 116. Indeed, generating the altered filtered provider objects 1908 may occur in any suitable order at the engines 112, 114, 116.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, cannot filter provider objects, cannot alter provider objects, among other features and functions set forth herein).

It is further understood that instance of the term "configured to", such as "a computing device configured to . . . ", "a processor configured to . . . ", "a controller configured to . . . ", and the like, may be understood to include a feature of a computer-readable storage medium having stored thereon program instructions that, when executed by a computing device and/or a processor and/or a controller, and the like, may cause the computing device and/or the processor and/or the controller to perform a set of operations which may comprise the features that the computing device and/or the processor and/or the controller, and the like, are configured to implement. Hence, the term "configured to" is understood not to be unduly limiting to means plus function interpretations, and the like.

Furthermore, descriptions of one processor and/or controller and/or device and/or engine, and the like, configured to perform certain functionality is understood to include, but is not limited to, more than one processor and/or more than one controller and/or more than one device and/or more than one engine, and the like performing such functionality.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein may be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein may be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program may be stored as a computer program product comprising a computer usable medium. Further, a persistent storage device may comprise the computer readable program code. It is yet further appreciated that the computer-readable program code and/or computer usable medium may comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium may be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:

implementing, via an intermediation server, a computing-process flow associated with a client device and one or more provider systems;

receiving, via the intermediation server, from the client device, during implementation of the computing-process flow, search criteria;

receiving, via the intermediation server, during implementation of the computing-process flow, provider objects that meet the search criteria, the provider objects associated with the one or more provider systems;

applying, via the intermediation server, computer-code content filters to the provider objects, the computer-code content filters received from one or more computing devices excluded from the computing-process flow, the one or more computing devices excluded from the computing-process flow being different from the intermediation server, the client device and the one or more provider systems;

when a given provider object fails to pass all the computer-code content filters, removing, via the intermediation server, the given provider object from the provider objects, to generate filtered provider objects; and providing, via the intermediation server, during implementation of the computing-process flow, the filtered provider objects to the client device;

wherein the method further comprises:

prior to implementing the computing-process flow, receiving the computer-code content filters from the one or more computing devices excluded from the computing-process flow;

storing the computer-code content filters at a memory; and applying respective timestamps to the computer-code content filters, the respective timestamps indicating when a respective computer-code content filter was one or more of received, generated and populated at the memory; and wherein the method further comprises:

when the given provider object comprises a first component that passes a given computer-code content filter and a second component that fails to pass the given computer-code content filter removing the second component from the given provider object to generate an updated provider object;

adding the updated provider object to the filtered provider objects provided to the client device.

2. The method of claim 1, further comprising:

prior to implementing the computing-process flow, receiving the computer-code content filters from the one or more computing devices excluded from the computing-process flow; and storing the computer-code content filters at the memory, wherein applying the computer-code content filters to the provider objects comprises one or more: accessing the computer-code content filters at the memory; and retrieving the computer-code content filters from the memory.

3. The method of claim 1, further comprising:

implementing an audit process for a provider object associated with a payment during implementation of the computing-process flow, wherein the provider object passed all the computer-code content filters, the audit process comprising:

determining the respective timestamps of the computer-code content filters the respective timestamps further indicative of when the computer-code content filters were received from the one or more computing devices excluded from the computing-process flow and generating a report indicative of when the provider object was provided to the client device relative to the respective timestamps.

4. The method of claim 1, further comprising:

prior to implementing the computing-process flow, receiving indications of the computer-code content filters from the one or more computing devices excluded from the computing-process flow;

converting the indications to the computer-code content filters; and storing the computer-code content filters at the memory.

5. The method of claim 1, further comprising:

applying, the computer-code content filters and further computer-code content filters to the provider objects, the further computer-code content filters received from one or more of the client device, the one or more provider systems and the intermediation server;

when the given provider object fails to pass all of the computer-code content filters and the further computer-code content filters, removing the given provider object from the provider objects, to generate the filtered provider objects; and providing the filtered provider objects to the client device.

6. The method of claim 1, further comprising one or more of:

failing the given provider object when the first component of the given provider object passes the given computer-code content filter and the second component of the given provider object fails to pass the given computer-code content filter; and, failing the given provider object when the first component of the given provider object fails to pass the given computer-code content filter and the second component of the given provider object passes, or fails to pass, the given computer-code content filter.

7. The method of claim 1, wherein a secondary provider object is dependent on a primary provider object, the method further comprising:

when the primary provider object fails to pass all the computer-code content filters, removing the primary provider object and the secondary provider object from the provider objects, to generate the filtered provider objects.

8. The method of claim 1, further comprising:

receiving a new computer-code content filter;

applying the new computer-code content filter to past provider objects associated with payments during previous implementations of the computing-process flow; and when a given past provider object fails the new computer-code content filter, providing an alert to a network address associated with the given past provider object.

9. An intermediation server comprising:

at least one hardware controller; and a computer-readable storage medium having stored thereon program instructions that, when executed by the at least one hardware controller, causes the at least one hardware controller to perform a set of operations comprising:

implementing a computing-process flow associated with a client device and one or more provider systems;

receiving, from the client device, during implementation of the computing-process flow, search criteria;

receiving, during implementation of the computing-process flow, provider objects that meet the search criteria, the provider objects associated with the one or more provider systems;

applying computer-code content filters to the provider objects, the computer-code content filters received from one or more computing devices excluded from the computing-process flow, the one or more computing devices excluded from the computing-process flow being different from the client device and the one or more provider systems;

when a given provider object fails to pass all the computer-code content filters, removing the given provider object from the provider objects, to generate filtered provider objects; and providing, during implementation of the computing-process flow, the filtered provider objects to the client device, wherein a secondary provider object is dependent on a primary provider object, and the set of operations further comprises:

when the primary provider object fails to pass all the computer-code content filters, removing the primary provider object and the secondary provider object from the provider objects, to generate the filtered provider objects;

wherein the set of operations further comprises:

when the given provider object comprises a first component that passes a given computer-code content filter and a second component that fails to pass the given computer-code content filter, removing the second component from the given provider object to generate an updated provider object; and adding the updated provider object to the filtered provider objects provided to the client device.

10. The intermediation server of claim 9, wherein the set of operations further comprises:

prior to implementing the computing-process flow, receiving the computer-code content filters from the one or more computing devices excluded from the computing-process flow; and storing the computer-code content filters at a memory, wherein applying the computer-code content filters to the provider objects comprises one or more: accessing the computer-code content filters at the memory; and retrieving the computer-code content filters from the memory.

11. The intermediation server of claim 9, wherein the set of operations further comprises:

prior to implementing the computing-process flow, receiving the computer-code content filters from the one or more computing devices excluded from the computing-process flow;

storing the computer-code content filters at a memory; and applying respective timestamps to the computer-code content filters, the respective timestamps indicating when a respective computer-code content filter was one or more of received, generated and populated at the memory.

12. The intermediation server of claim 9, wherein the set of operations further comprises:

implementing an audit process for a provider object associated with a payment during implementation of the computing-process flow, wherein the provider object passed all the computer-code content filters, the audit process comprising:

determining respective timestamps of the computer-code content filters, the respective timestamps indicative of when the computer-code content filters were received from the one or more computing devices excluded from the computing-process flow; and generating a report indicative of when the provider object was provided to the client device relative to the respective timestamps.

13. The intermediation server of claim 9, wherein the set of operations further comprises:

prior to implementing the computing-process flow, receiving indications of the computer-code content filters from the one or more computing devices excluded from the computing-process flow;

converting the indications to the computer-code content filters; and storing the computer-code content filters at a memory.

14. The intermediation server of claim 9, wherein the set of operations further comprises:

applying, the computer-code content filters and further computer-code content filters to the provider objects, the further computer-code content filters received from one or more of the client device, the one or more provider systems and the intermediation server;

when the given provider object fails to pass all of the computer-code content filters and the further computer-code content filters, removing the given provider object from the provider objects, to generate the filtered provider objects; and providing, via the intermediation server, the filtered provider objects to the client device.

15. The intermediation server of claim 9, wherein the set of operations further comprises one or more of:

failing the given provider object when the first component of the given provider object passes the given computer-code content filter and the second component of the given provider object fails to pass the given computer-code content filter; and failing the given provider object when the first component of the given provider object fails to pass the given computer-code content filter and the second component of the given provider object passes, or fails to pass, the given computer-code content filter.

16. The intermediation server of claim 9, wherein the set of operations further comprises:

receiving a new computer-code content filter;

applying the new computer-code content filter to past provider objects associated with payments during previous implementations of the computing-process flow; and when a given past provider object fails the new computer-code content filter, providing an alert to a network address associated with the given past provider object.

17. A method comprising:

implementing, via an intermediation server, a computing-process flow associated with a client device and one or more provider systems;

receiving, via the intermediation server, from the client device, during implementation of the computing-process flow, search criteria;

receiving, via the intermediation server, during implementation of the computing-process flow, provider objects that meet the search criteria, the provider objects associated with the one or more provider systems;

applying, via the intermediation server, computer-code content filters to the provider objects, the computer-code content filters received from one or more computing devices excluded from the computing-process flow, the one or more computing devices excluded from the computing-process flow being different from the intermediation server, the client device and the one or more provider systems;

when a given provider object fails to pass all the computer-code content filters, removing, via the intermediation server, the given provider object from the provider objects, to generate filtered provider objects; and providing, via the intermediation server, during implementation of the computing-process flow, the filtered provider objects to the client device;

wherein the method further comprises:

receiving a new computer-code content filter;

applying the new computer-code content filter to past provider objects associated with payments during previous implementations of the computing-process flow; and when a given past provider object fails the new computer-code content filter, providing an alert to a network address associated with the given past provider object; and, wherein the method further comprises:

when the given provider object comprises a first component that passes a given computer-code content filter and a second component that fails to pass the given computer-code content filter removing the second component from the given provider object to generate an updated provider object;

adding the updated provider object to the filtered provider objects provided to the client device.

* * * * *